US012611759B2

(12) United States Patent
Ying

(10) Patent No.: US 12,611,759 B2
(45) Date of Patent: Apr. 28, 2026

(54) TOOL HEAD REPLACEMENT STRUCTURE FOR ELECTRIC TOOLS

(71) Applicant: Yongkang Yishun Tools Co., Ltd., Jinhua City (CN)

(72) Inventor: Hao Ying, Jinhua City (CN)

(73) Assignee: Yongkang Yishun Tools Co., Ltd., Jinhua City (CN)

( * ) Notice: Subject to any disclaimer, the term of this patent is extended or adjusted under 35 U.S.C. 154(b) by 0 days.

(21) Appl. No.: 19/300,730

(22) Filed: Aug. 15, 2025

(65) Prior Publication Data

US 2026/0084279 A1 Mar. 26, 2026

(30) Foreign Application Priority Data

Sep. 24, 2024 (CN) .......................... 202422331373.9

(51) Int. Cl.
*B25F 5/02* (2006.01)
*B25F 3/00* (2006.01)
*B23D 57/02* (2006.01)

(52) U.S. Cl.
CPC .................. *B25F 3/00* (2013.01); *B25F 5/02* (2013.01); *B23D 57/023* (2013.01)

(58) Field of Classification Search
CPC .............. B25F 3/00; B25F 5/02; B23D 57/02
USPC ..... 173/1–2, 13, 18–20, 184, 25–31, 38–39, 173/45–53
See application file for complete search history.

(56) References Cited

U.S. PATENT DOCUMENTS

| | | | | |
|---|---|---|---|---|
| 4,945,790 | A | * | 8/1990 | Golden .................... B25B 21/00 81/177.4 |
| 5,033,552 | A | * | 7/1991 | Hu ........................... B25B 21/00 241/37.5 |
| 5,094,133 | A | * | 3/1992 | Schreiber ............ B25B 23/0064 173/15 |
| 5,513,709 | A | * | 5/1996 | Fisher .................. B25D 11/102 173/205 |
| 6,039,126 | A | * | 3/2000 | Hsieh ........................ B66F 3/12 173/217 |
| 6,061,901 | A | * | 5/2000 | Tanaka .................. B25B 21/023 29/798 |

(Continued)

FOREIGN PATENT DOCUMENTS

| | | | | |
|---|---|---|---|---|
| CN | 103722537 A | * | 4/2014 | |
| CN | 114192840 A | * | 3/2022 | ................ B25F 5/00 |

(Continued)

*Primary Examiner* — Robert F Long
(74) *Attorney, Agent, or Firm* — Nicholas Makridakis

(57) ABSTRACT

A tool head replacement structure includes a body, a tool head, a locking mechanism, where the body is provided with a connecting end, a connecting portion is arranged on the tool head, and the connecting portion is arranged in the connecting end. The locking mechanism includes a locking ring, the locking ring is annularly provided with a plurality of first locking clasps and first locking blocks, and the connecting portion is annularly provided with a plurality of second locking blocks and second locking clasps. The first locking clasp and the second locking clasp are respectively provided with a first locking groove and a second locking groove, the locking ring is provided with an actuating portion, and the locking ring is driven to rotate. The first locking block and the second locking block disengage from the second locking groove and the first locking groove.

9 Claims, 15 Drawing Sheets

(56)                  References Cited

U.S. PATENT DOCUMENTS

| | | | | |
|---|---|---|---|---|
| 6,176,322 | B1 * | 1/2001 | Wadge | B25F 3/00 |
| | | | | 408/4 |
| 6,286,611 | B1 * | 9/2001 | Bone | B25F 3/00 |
| | | | | 173/217 |
| 7,926,780 | B2 * | 4/2011 | Yeh | F16F 15/08 |
| | | | | 411/103 |
| 8,317,350 | B2 * | 11/2012 | Friedman | B23Q 17/2404 |
| | | | | 362/120 |
| 10,449,588 | B2 * | 10/2019 | Berghaus | B21D 41/04 |
| 11,369,171 | B2 * | 6/2022 | Tan | A44C 5/2061 |
| 11,504,830 | B2 * | 11/2022 | Gordon | B25B 23/0028 |
| 12,011,819 | B2 * | 6/2024 | Lv | B25F 5/02 |
| 2001/0005068 | A1 * | 6/2001 | Gifford | B23Q 3/12 |
| | | | | 408/239 R |
| 2002/0050366 | A1 * | 5/2002 | Driessen | B25F 3/00 |
| | | | | 173/217 |
| 2002/0050368 | A1 * | 5/2002 | Driessen | B25F 3/00 |
| | | | | 173/217 |
| 2003/0029295 | A1 * | 2/2003 | Yoshimizu | B23D 29/00 |
| | | | | 83/697 |
| 2003/0066667 | A1 * | 4/2003 | Zhang | B25F 3/00 |
| | | | | 173/217 |
| 2006/0088393 | A1 * | 4/2006 | Cooper | B25F 3/00 |
| | | | | 408/239 R |
| 2006/0244224 | A1 * | 11/2006 | Zhou | B23B 31/123 |
| | | | | 279/62 |
| 2007/0251359 | A1 * | 11/2007 | Junkers | B25B 21/002 |
| | | | | 81/463 |
| 2010/0032179 | A1 * | 2/2010 | Hanspers | B25F 5/00 |
| | | | | 173/11 |
| 2011/0127731 | A1 * | 6/2011 | Woecht | B25F 3/00 |
| | | | | 279/143 |
| 2013/0020103 | A1 * | 1/2013 | Mcclaskey | B25F 3/00 |
| | | | | 173/29 |
| 2013/0020106 | A1 * | 1/2013 | Kuehne | B25F 5/02 |
| | | | | 173/214 |
| 2013/0093142 | A1 * | 4/2013 | Saur | B23B 31/0261 |
| | | | | 279/44 |
| 2013/0118767 | A1 * | 5/2013 | Cannaliato | B25F 3/00 |
| | | | | 173/29 |
| 2013/0228355 | A1 * | 9/2013 | Kuehne | B25F 5/02 |
| | | | | 173/29 |
| 2013/0245704 | A1 * | 9/2013 | Koltz | A61B 17/1622 |
| | | | | 606/1 |
| 2014/0131058 | A1 * | 5/2014 | Keith | B25F 5/02 |
| | | | | 173/18 |
| 2014/0190017 | A1 * | 7/2014 | Maynez | A01D 34/416 |
| | | | | 173/217 |
| 2014/0332243 | A1 * | 11/2014 | Baskar | B25F 5/02 |
| | | | | 173/29 |
| 2015/0343583 | A1 * | 12/2015 | McRoberts | B23Q 5/045 |
| | | | | 173/213 |
| 2016/0242779 | A1 * | 8/2016 | Aranyi | A61B 17/07207 |
| 2018/0056496 | A1 * | 3/2018 | Rubens | B44B 7/02 |
| 2018/0104809 | A1 * | 4/2018 | Dyer | B27B 17/0016 |
| 2018/0161951 | A1 * | 6/2018 | Billings | F21V 23/0471 |
| 2018/0178366 | A1 * | 6/2018 | Matei | B25B 21/00 |
| 2018/0345432 | A1 * | 12/2018 | Hill | B23Q 5/045 |
| 2018/0361555 | A1 * | 12/2018 | Miaowu | A01D 34/84 |
| 2019/0015963 | A1 * | 1/2019 | Moylan | B25F 3/00 |
| 2019/0160643 | A1 * | 5/2019 | Lefavour | B25F 5/005 |
| 2019/0217459 | A1 * | 7/2019 | Gregorich | B23D 51/16 |
| 2019/0291157 | A1 * | 9/2019 | Fuentes | B21D 1/10 |
| 2019/0308309 | A1 * | 10/2019 | Gregorich | B23B 45/003 |
| 2022/0055120 | A1 * | 2/2022 | Zhong | B23B 31/1238 |
| 2022/0061836 | A1 * | 3/2022 | Parihar | A61B 17/115 |
| 2022/0104820 | A1 * | 4/2022 | Shelton, IV | A61B 17/07207 |
| 2022/0193882 | A1 * | 6/2022 | Lv | B25F 5/02 |
| 2022/0325837 | A1 * | 10/2022 | Guibert | F16L 37/103 |
| 2023/0108174 | A1 * | 4/2023 | Li | B25F 3/00 |
| | | | | 403/361 |
| 2024/0326207 | A1 * | 10/2024 | Kaye, Jr. | B25B 27/10 |

FOREIGN PATENT DOCUMENTS

| | | | | |
|---|---|---|---|---|
| CN | 223251576 U | * | 8/2025 | |
| DE | 102013003252 A1 | * | 8/2014 | G01S 5/18 |
| DE | 102016104075 A1 | * | 9/2017 | B25F 3/00 |
| DK | 178144 B1 | * | 6/2015 | B25B 21/00 |

* cited by examiner

TOOL HEAD REPLACEMENT STRUCTURE FOR ELECTRIC TOOLS

TECHNICAL FIELD

The present disclosure belongs to the technical field of electric tools, and particularly relates to a tool head replacement structure for electric tools.

BACKGROUND

An electric tool in the prior art is provided with a motor and a transmission structure arranged in a gun-shaped body, and a tool head is connected to a front end of the body. The transmission structure drives the transmission structure of the tool head, such that an acting end of the tool head has a function of rotating or reciprocating movement, which may be used for article processing or threaded locking of objects. In order to facilitate the disassembly and replacement of the tool head, each of most electric tools currently available on the market is usually provided with a locking mechanism between the tool head and the body, such that the tool head is quickly installed on the body. For example, in the Chinese Patent CN216030622U, the tool head is installed by inserting into a receptacle opening of the body housing through a socket, and then a coupling barrel portion on the socket penetrates a rotating ring in the body housing. A plurality of clasp blocks at a distal end of the barrel portion are located behind the rotating ring. In this case, the rotating ring is driven by a lifting lever to move in a first steering direction, and a limiting block on the rotating ring moves to a position directly in front of the clasp block, such that the limiting block and the clasp block are locked, the barrel portion is restricted from disengaging from the body housing, and the tool head is smoothly installed on the body. The tool head of the electric tool is snap-fitted with the clasp block at the distal end of the barrel portion through the limiting block on the rotating ring, such that the tool head is tightly locked on the body. However, due to a small contact area between the limiting block and the clasp block, a locking force between the tool head and the body is weak, and a joint between the tool head and the body is loosened after the tool head operates for a long time, causing the tool head to shake, thereby affecting the use by the operator, which even causes casualties when the tool head falls to the ground during operation.

SUMMARY

An objective of the present disclosure is to provide a tool head replacement structure for electric tools, and the tool head replacement structure has a simple structure and a double-layer locking structure, ensures that a tool head is more stably and firmly installed on a body, and avoids the situation that a joint between a tool head and the body is loosened after the tool head operates for a long time.

The objective of the present disclosure is implemented as follows:

A tool head replacement structure for electric tools, includes a body, a tool head detachably arranged on the body, a locking mechanism arranged between the body and the tool head, where the body is provided with a connecting end, a connecting portion is arranged on one side of the tool head facing the connecting end, and the connecting portion is arranged in the connecting end; the locking mechanism includes a locking ring arranged in the connecting end, the locking ring is annularly provided with a plurality of first locking clasps and first locking blocks, and the connecting portion is annularly provided with a plurality of second locking blocks and second locking clasps that are matched with the plurality of first locking clasps and first locking blocks; the first locking clasp and the second locking clasp are respectively provided with a first locking groove and a second locking groove, the locking ring is provided with an actuating portion exposed outside the body, and the locking ring is driven to rotate by driving the actuating portion; in this case, the first locking block and the second locking block are respectively snap-fitted into the second locking groove and the first locking groove and snap-fitted with the second locking clasp and the first locking clasp, such that the tool head and the body are locked; and when the actuating portion is driven to rotate reversely, the first locking block and the second locking block respectively disengage from the second locking groove and the first locking groove, such that the tool head and the body are unlocked.

Further, the first locking clasp includes a first connecting plate and a first clasping portion that are integrally formed, the first clasping portion is "L"-shaped and transversely arranged at a top end of the first connecting plate, the first locking block is located on one side of the first connecting plate and integrally formed with the first connecting plate, and the second locking clasp includes a second connecting plate and a second clasping portion that are integrally formed, where the second clasping portion is "L"-shaped and transversely arranged at a top end of the second connecting plate, and the second locking block is located on one side of the second connecting plate and integrally formed with the second connecting plate.

Further, a reinforcing rib is arranged on a rear side surface of the first connecting plate.

Further, a first mounting slot is formed in the body, the first mounting slot is located on a rear side of the locking ring, an opening is formed on one side of the first mounting slot facing the locking ring, a main damping block is movably arranged in the first mounting slot, a front end of the main damping block penetrates the opening and is exposed outside the first mounting slot, a main damping protrusion is arranged at the front end of the main damping block, and an upper damping recess and a lower damping recess are formed on a back surface of the locking ring, the main damping protrusion is snap-fitted into the upper damping recess or the lower damping recess and abuts against the locking ring, and a main damping spring is further arranged in the first mounting slot, where both ends of the main damping spring respectively abut against an inner wall of the first mounting slot and a rear end of the main damping block.

Further, a second mounting slot is further formed in the body, the second mounting slot is located on a right side of the locking ring, an opening is formed on one side of the second mounting slot facing the locking ring, a secondary damping block is movably arranged in the second mounting slot, a front end of the secondary damping block penetrates the opening and is exposed outside the second mounting slot, a secondary damping protrusion is arranged at the front end of the secondary damping block, an upper damping notch and a lower damping notch are formed on a side surface of the locking ring, the secondary damping protrusion is snap-fitted into the upper damping notch or the lower damping notch and abuts against the locking ring, and a secondary damping spring is further arranged in the second mounting slot, where both ends of the secondary damping spring respectively abut against an inner wall of the second mounting slot and a rear end of the secondary damping block.

Further, a limiting groove is formed at a rear end of either of the main damping block and the secondary damping block, and the main damping spring and the secondary damping spring are respectively arranged in the limiting grooves of the main damping block and the secondary damping block.

Further, abutment portions are symmetrically arranged on inner walls of both sides of the first mounting slot and the second mounting slot, snap-fit portions are arranged on both sides of both the main damping block and the secondary damping block, and the snap-fit portion is arranged between the symmetric abutment portions.

Further, a sliding channel is arranged in the body, a pushing plate is slidably arranged in the sliding channel, an installation channel is arranged on the pushing plate, a first limiting post and a second limiting post are arranged in the installation channel, a pushing spring is arranged in the installation channel, a front end of the pushing spring is sleeved on the first limiting post, a rear end of the pushing spring is sleeved on the second limiting post, limiting portions are arranged on both sides of an inner wall of the sliding channel, and a limiting protrusion is arranged at a top end of the limiting portion, where a front end of the pushing spring abuts against the limiting portion and the limiting protrusion, the tool head is further provided with a connect-ing block, and the connecting block is inserted into the sliding channel.

Further, a driving motor and a control button configured to control the operation of the driving motor are further arranged in the body, a power output shaft is arranged on the driving motor, the power output shaft is located in the connecting end, the tool head is provided with a power transmission shaft and a driving assembly connected to the power transmission shaft, a connecting hole is formed on the connecting portion, the power transmission shaft is arranged in the connecting hole, a bearing groove is formed on an inner wall of the connecting hole, a bearing is sleeved on the power transmission shaft, the bearing is arranged in the bearing groove, and the power transmission shaft is pro-vided with a linkage hole, where after the connecting portion is inserted into the connecting end, the power output shaft is inserted into the linkage hole of the power transmission shaft.

Further, an actuating channel is arranged in the body, and the actuating portion penetrates the actuating channel and is exposed outside the body.

Compared with the prior art, the present disclosure has the following outstanding and beneficial technical effects:

The present disclosure belongs to the technical field of electric tools, and particularly relates to a tool head replace-ment structure for electric tools. The tool head replacement structure includes a body, a tool head, and a locking mecha-nism arranged between the body and the tool head. A connecting portion of the tool head is annularly provided with a plurality of second locking blocks and second locking clasps. The locking mechanism includes a locking ring, and an actuating portion on the locking ring is exposed outside the body, such that the user easily drives the locking ring to rotate through the actuating portion, and the tool head is quickly installed on the body. The locking ring is arranged in a connecting end, the number of first locking clasps and first locking blocks on the locking ring is the same as the number of the second locking blocks and the second locking clasps on the tool head, and the locking ring, the first locking clasps, the first locking blocks, and the actuating portion are all integrally formed, which facilitates manual assembly. Moreover, integral forming enhances the overall strength of components and extends the service life. To install the tool head on the body, the user first needs to insert the connecting portion on the tool head into the connecting end of the body. In this case, the user drives the locking ring to rotate synchronously by rotating the actuating portion. Since the second locking clasp on the tool head and the first locking clasp on the locking ring are respectively provided with a second locking groove and a first locking groove, after the locking ring rotates, the first locking blocks on the locking ring rotate synchronously together with the locking ring, such that the first locking blocks enter the second locking grooves and are snap-fitted with the second locking clasps. The first locking blocks and the second locking clasps are snap-fitted with each other to form a first-layer locking structure. Simultaneously, the first locking clasps on the locking ring also rotate synchronously together with the locking ring, such that the second locking blocks smoothly enter the first locking grooves and are snap-fitted with the first locking clasps. The first locking clasps and the second locking blocks are snap-fitted with each other to form a second-layer locking structure, such that the tool head is stably installed on the connecting end of the body. To disassemble the tool head from the body, the user only needs to reversely rotate the actuating portion to drive the locking ring to reversely rotate synchronously. In this case, the first locking blocks on the locking ring disengage from the second locking grooves and snap-fitted connection with the second locking clasps is released, and simultaneously, the second locking blocks on the connecting portion disengage from the first locking grooves and snap-fitted connection with the first locking clasps is released, such that locked connection between the connecting portion on the tool head and the locking ring in the body is released, and the tool head is smoothly separated from the body. In an electric tool currently available on the market, a contact area between the tool head and the body is relatively small, and a locking force between the tool head and the body is weak. After the tool head operates for a long time, a joint between the tool head and the body is easily loosened, resulting in that the tool head shakes, thereby affecting the use by the operator. A double-layer locking structure of the present disclosure ensures that the connecting portion on the tool head and the locking ring in the body are mutually locked with each other. A contact area between the connecting portion on the tool head and the locking ring is significantly increased through cooperation of the first locking blocks, the second locking clasps, the second locking blocks, and the first locking clasps, such that the locking force between the connecting portion on the tool head and the locking ring in the body is greater, and the tool head is stably and firmly installed on the connecting end of the body. After the tool head operates for a long time, the joint between the tool head and the body is not loosened, which ensures the normal use by the user, and prevents casualties caused when the tool head falls to the ground during operation.

REFERENCE NUMERALS IN THE FIGURES

Figure 1:
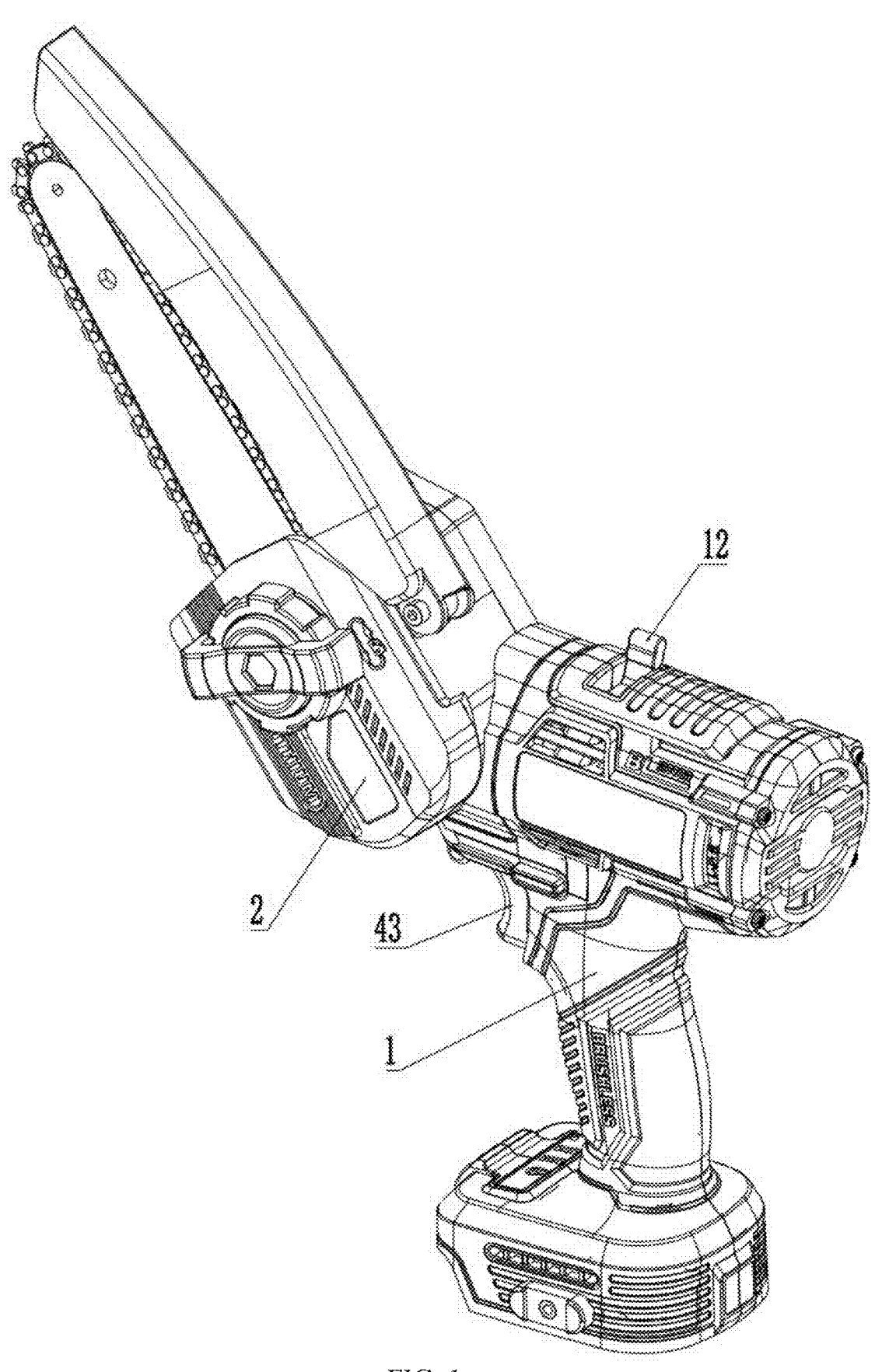
FIG. 1 is a perspective view of the present disclosure.
Figure 2:
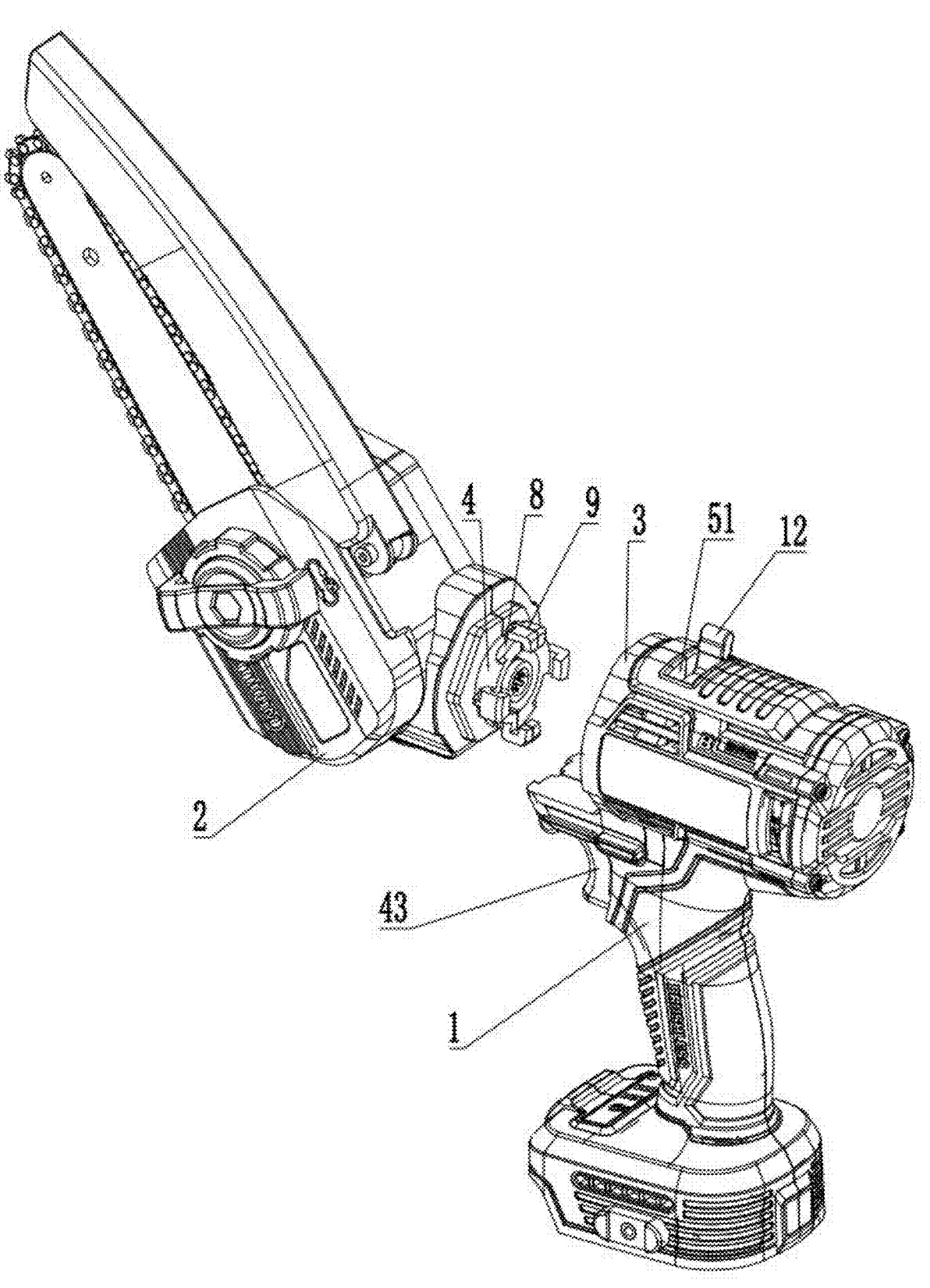
FIG. 2 is an exploded view I of a body and a tool head of the present disclosure.
Figure 3:
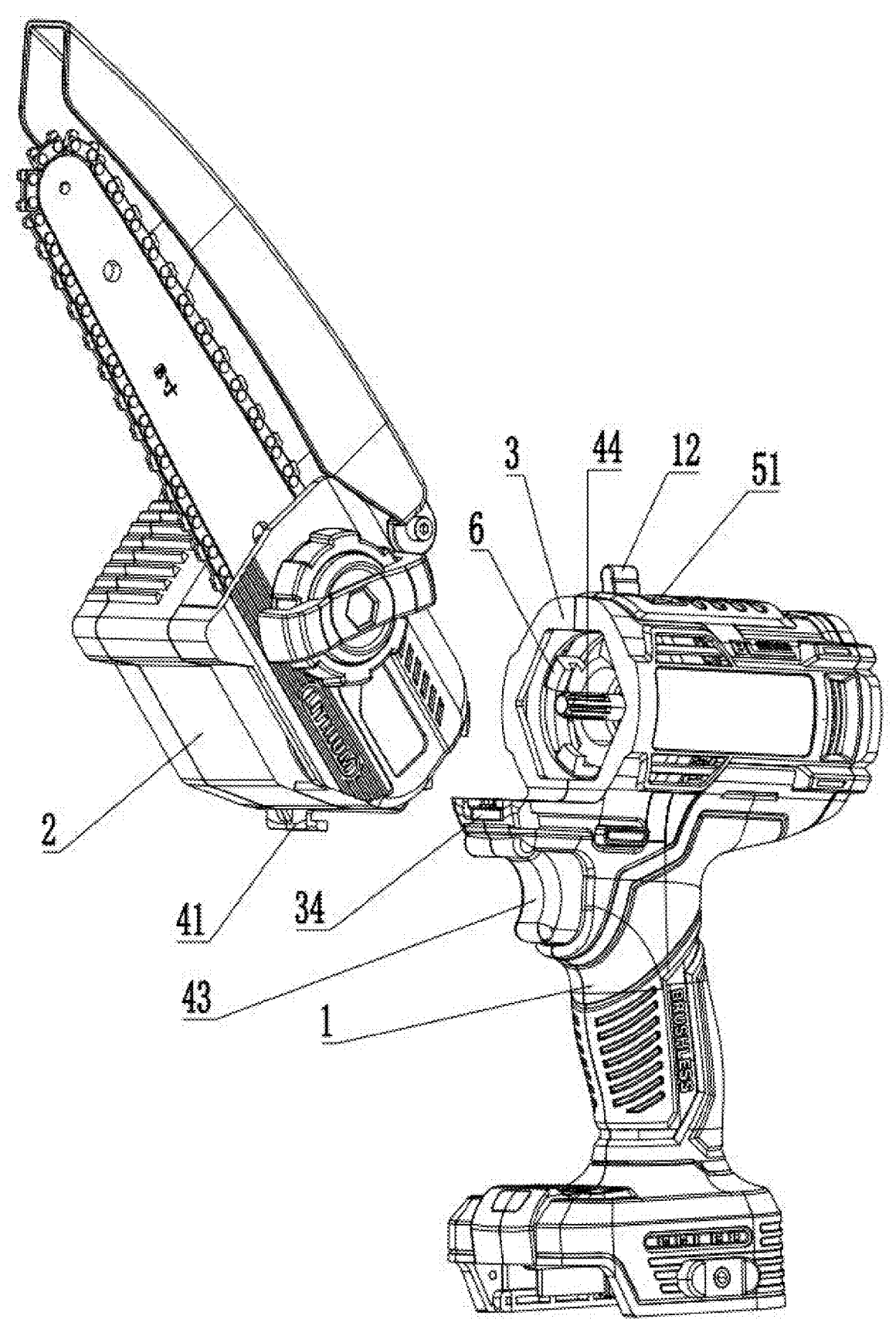
FIG. 3 is an exploded view II of a body and a tool head of the present disclosure.
Figure 4:
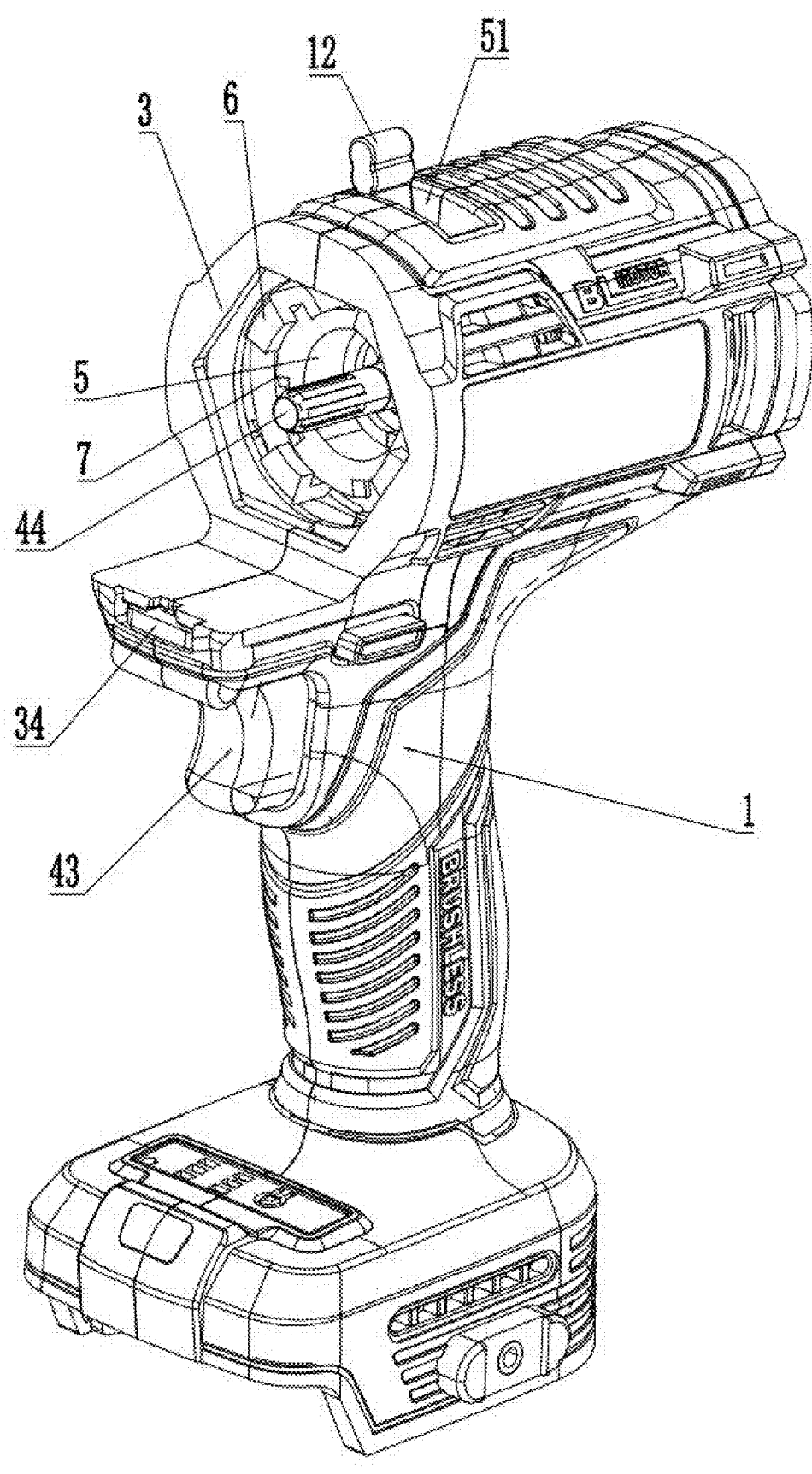
FIG. 4 is a perspective view of a body of the present disclosure.
Figure 5:
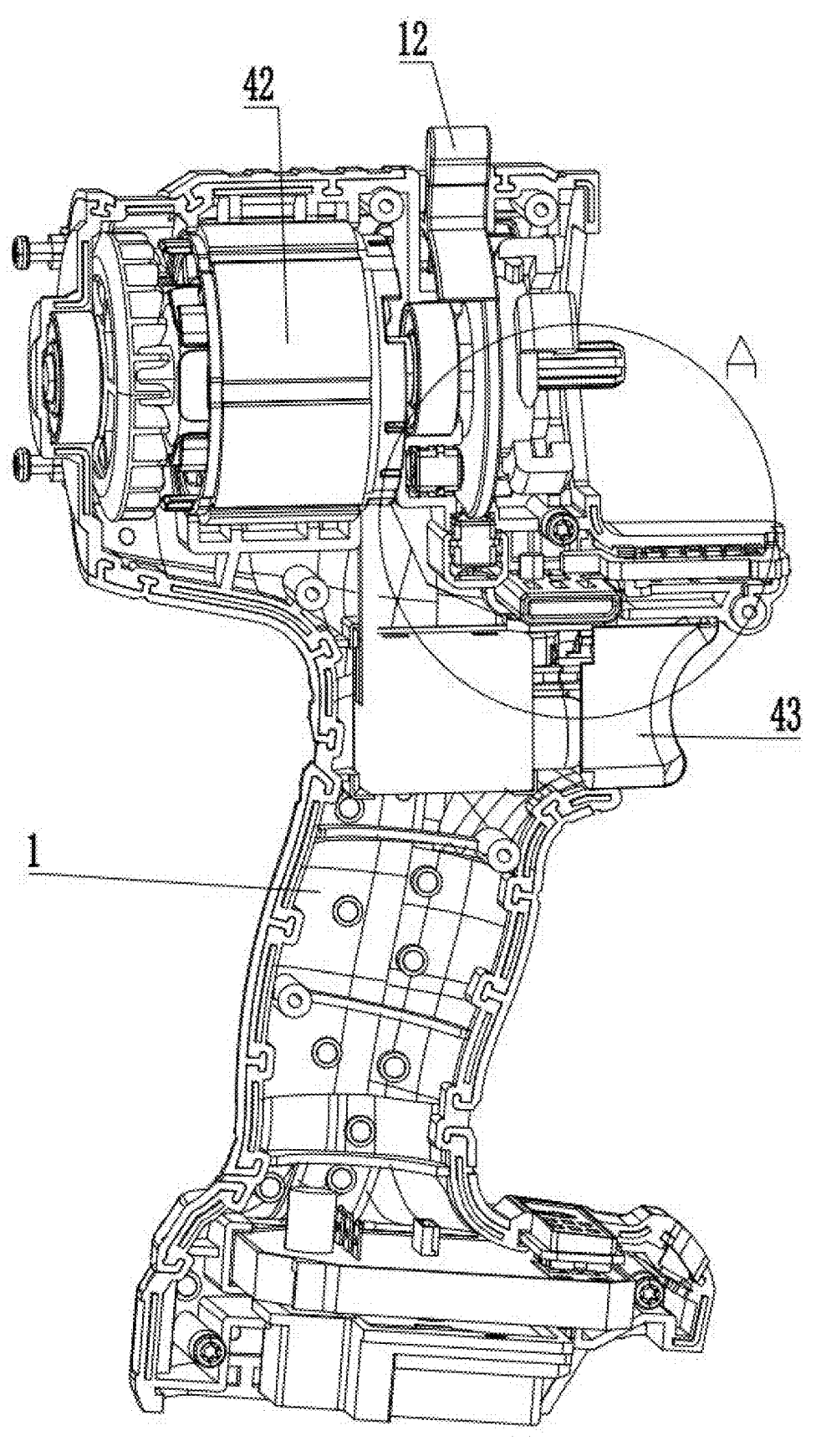
FIG. 5 is a schematic diagram of an internal structure of a body of the present disclosure.
Figure 6:
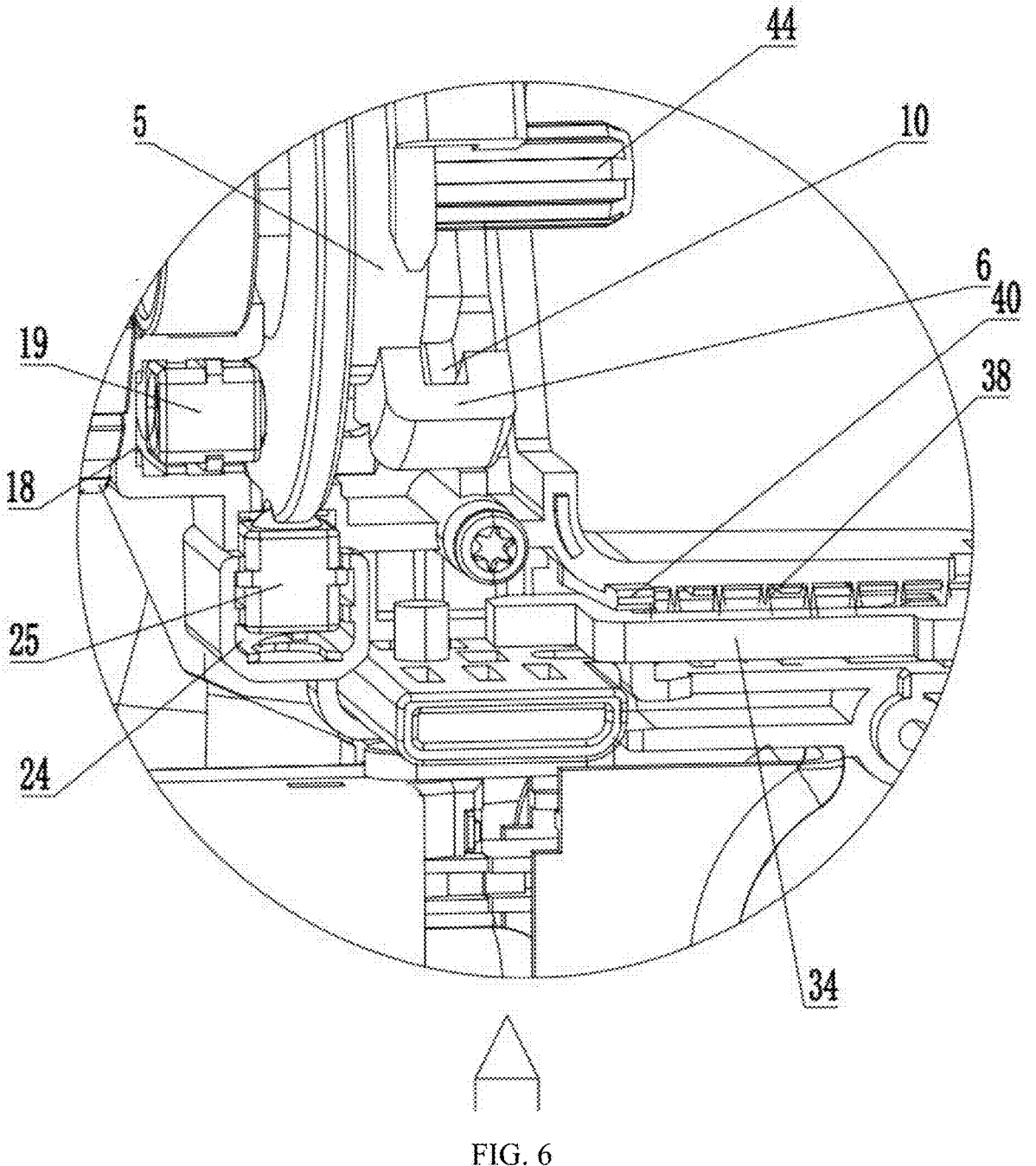
FIG. 6 is a partial enlarged view of a portion A in FIG. 5.
Figure 7:
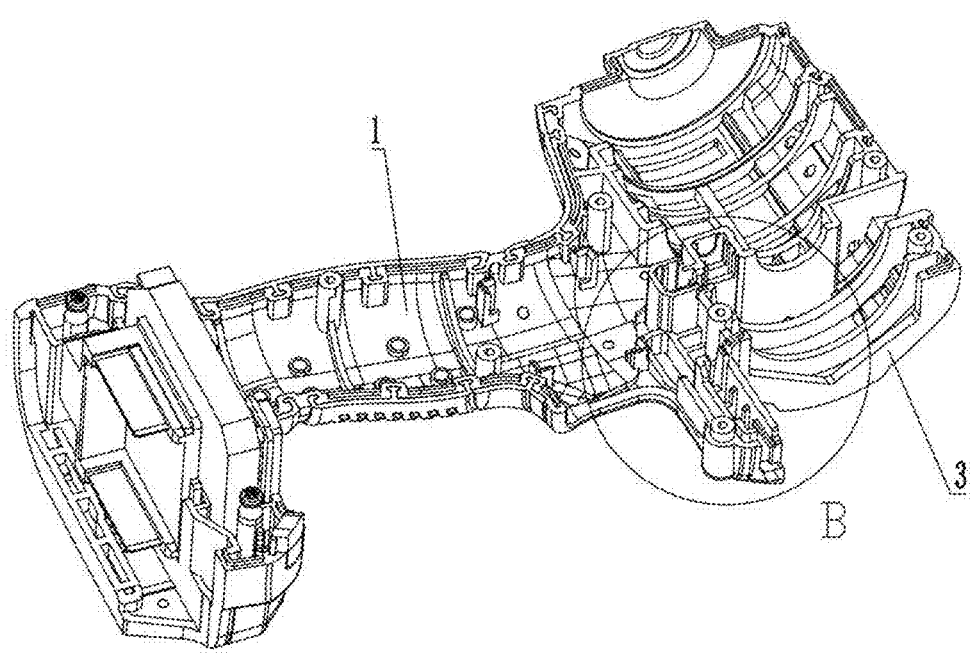
FIG. 7 is a schematic structural diagram of a body of the present disclosure.
Figure 8:
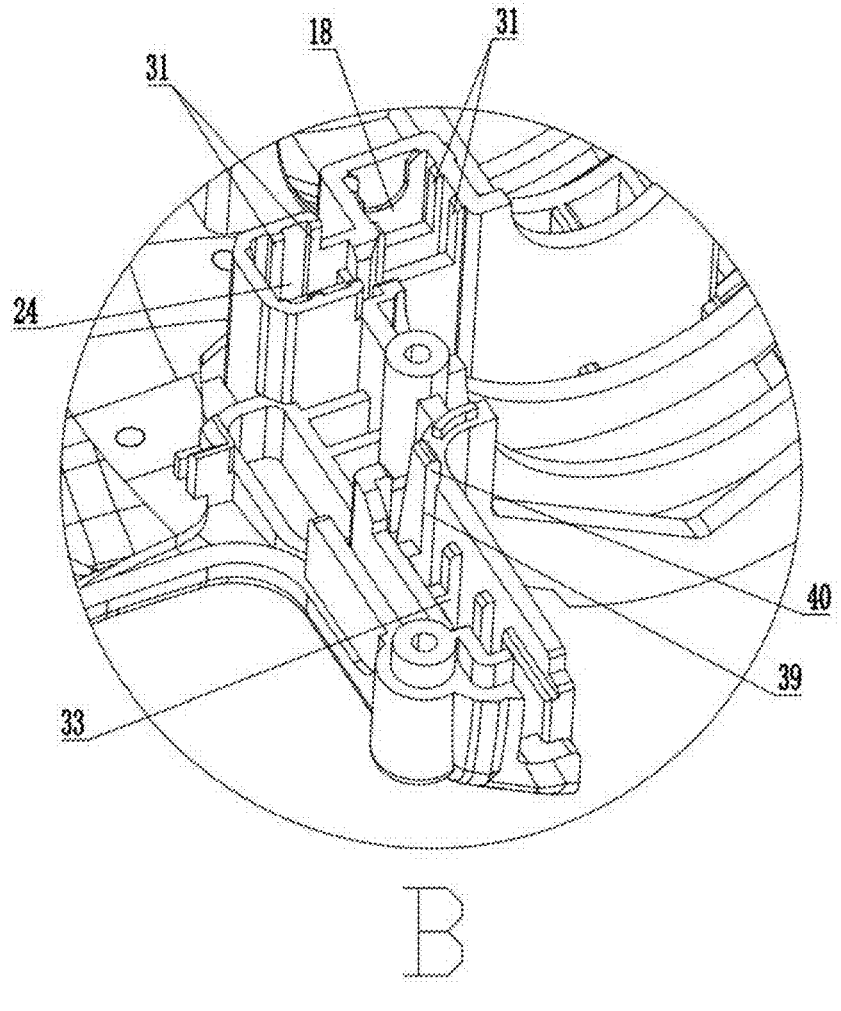
FIG. 8 is a partial enlarged view of a portion B in FIG. 7.
Figure 9:
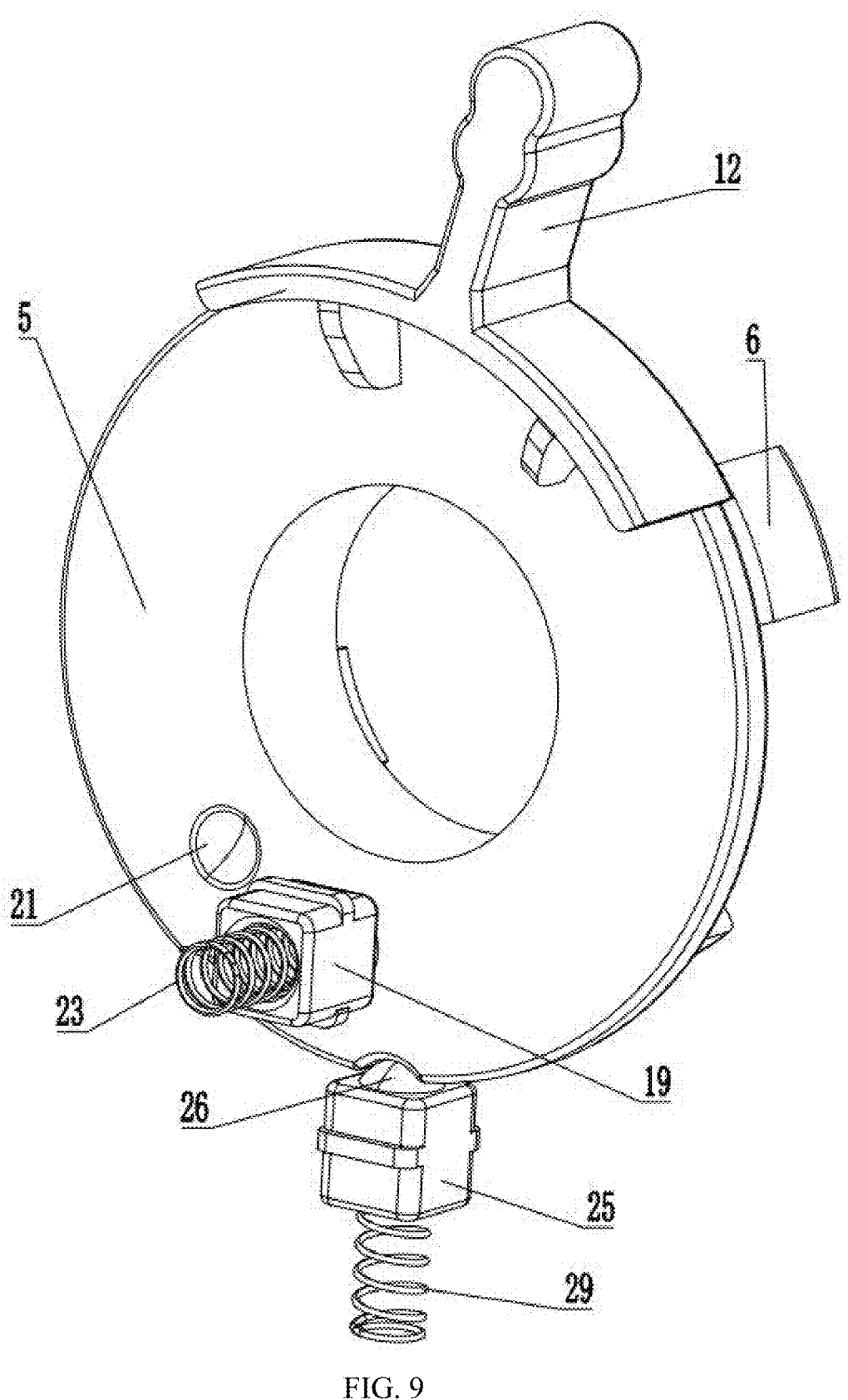
FIG. 9 is a schematic structural diagram of a locking ring, a main damping block, and a secondary damping block of the present disclosure.
Figure 10:
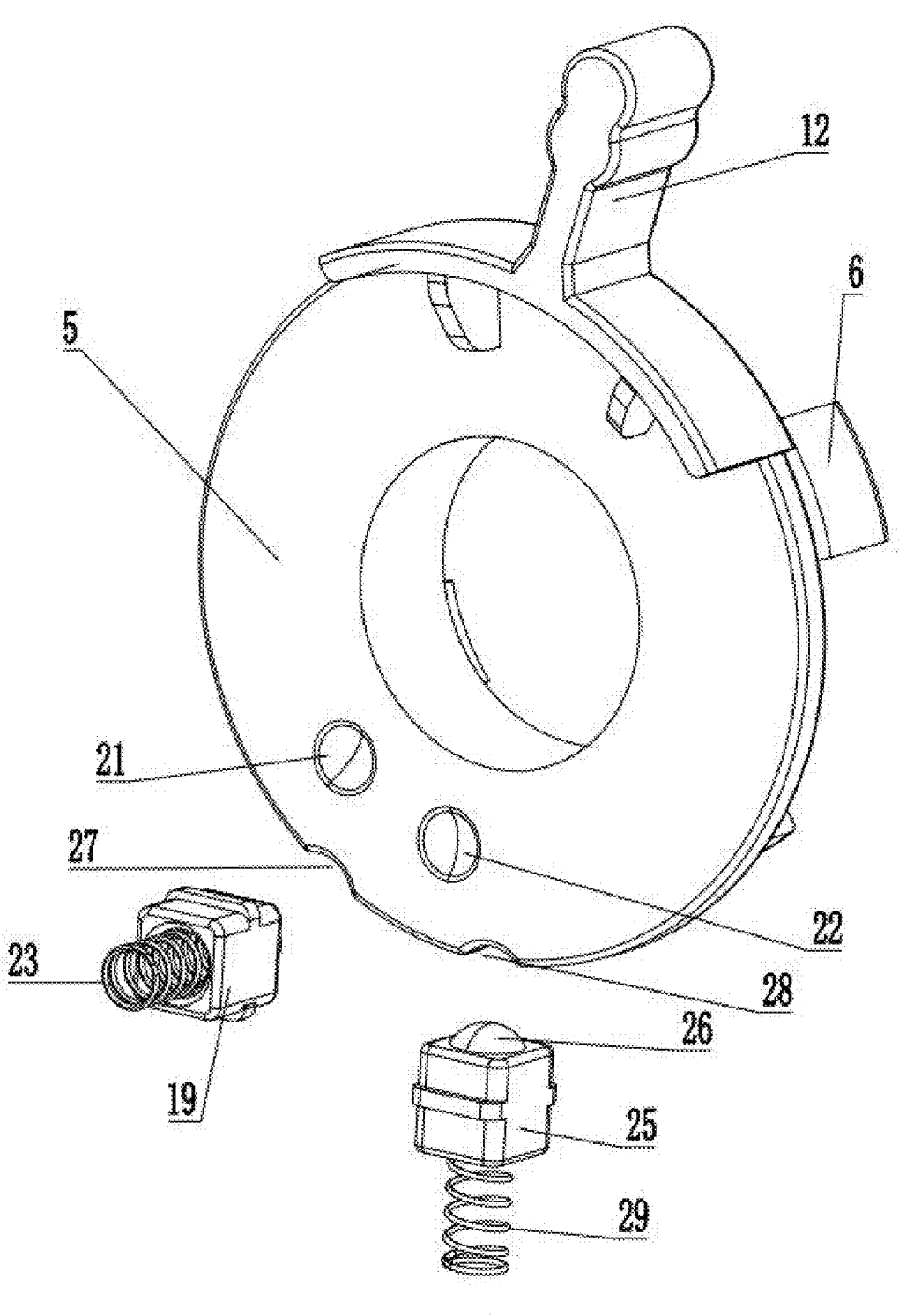
FIG. 10 is an exploded view of a locking ring, a main damping block, and a secondary damping block of the present disclosure.
Figure 11:
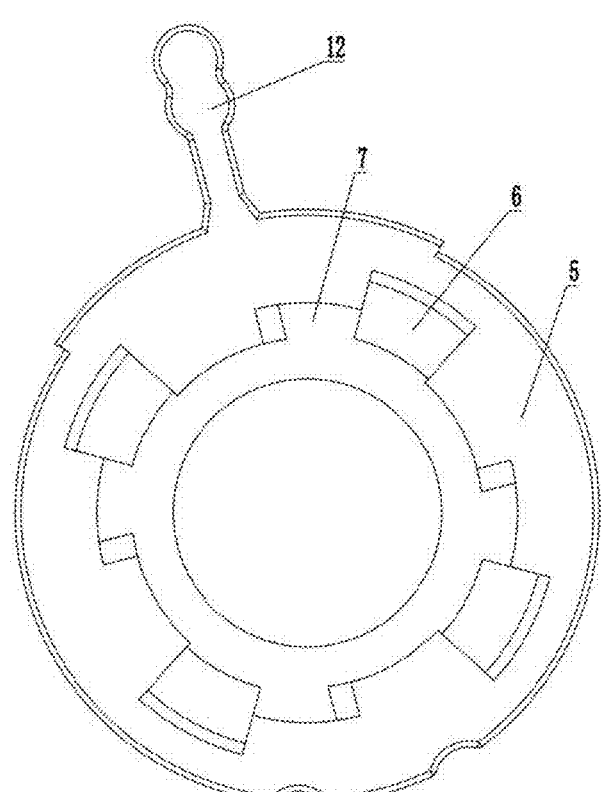
FIG. 11 is a schematic structural diagram of a locking ring of the present disclosure.
Figure 12:
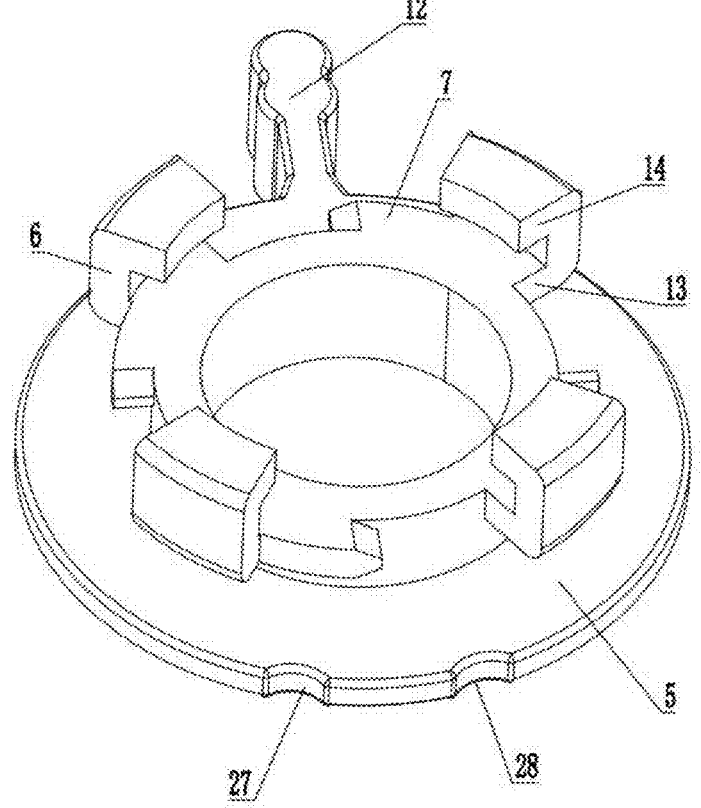
FIG. 12 is a perspective view of a locking ring of the present disclosure.
Figure 13:
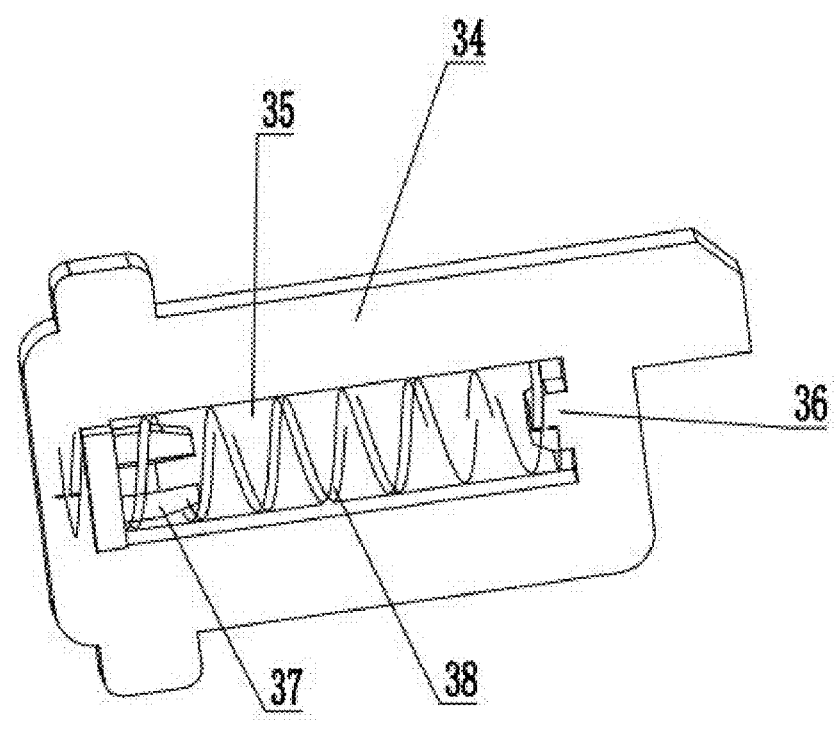
FIG. 13 is a perspective view of a pushing plate and a pushing spring of the present disclosure.
Figure 14:
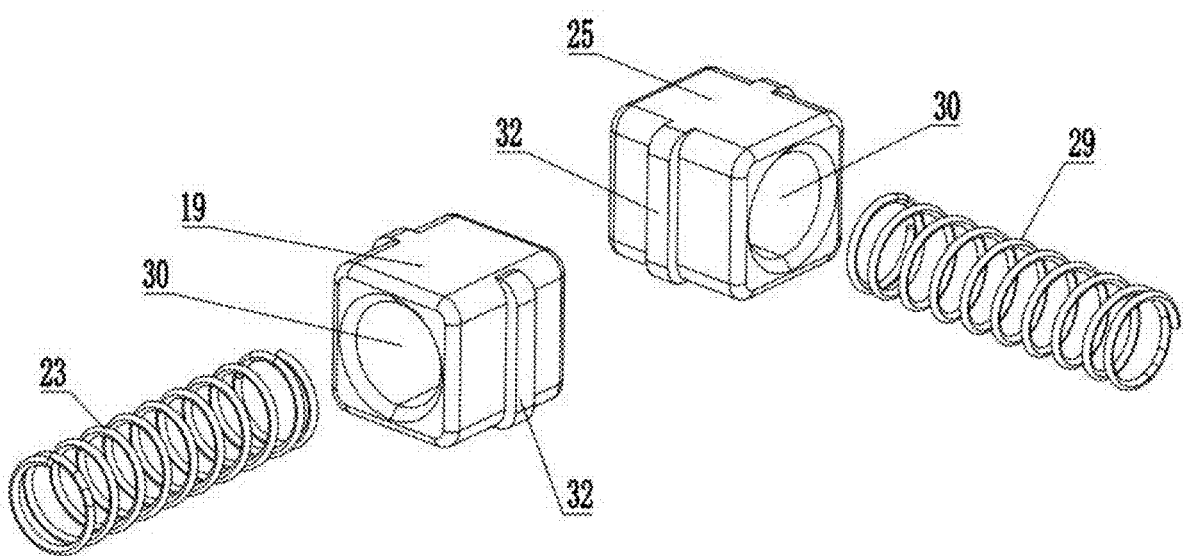
FIG. 14 is an exploded view I of a main damping block and a main damping spring, and a secondary damping block and a secondary damping spring of the present disclosure.
Figure 15:
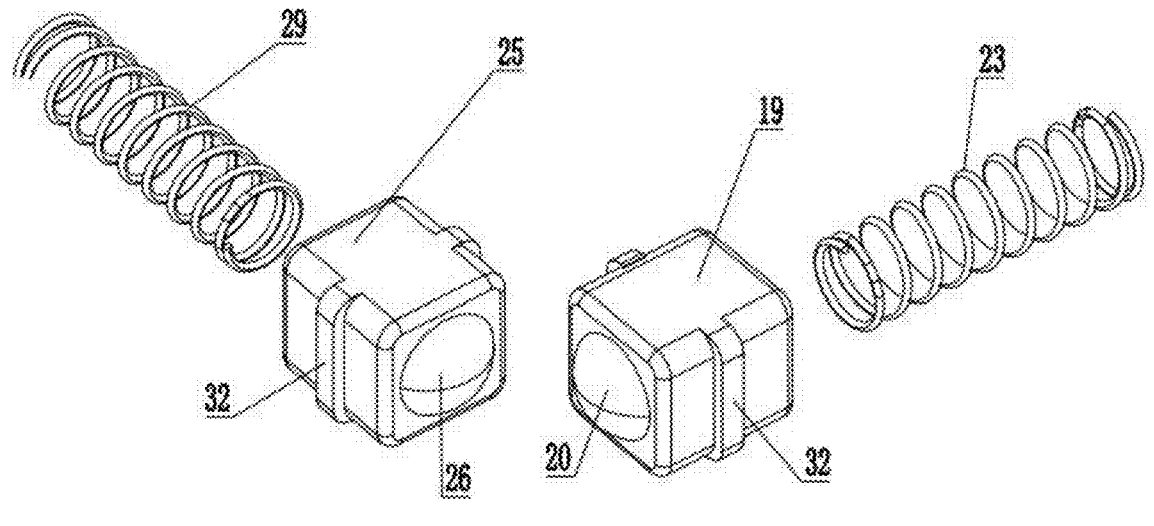
FIG. 15 is an exploded view II of a main damping block and a main damping spring, and a secondary damping block and a secondary damping spring of the present disclosure.
Figure 16:
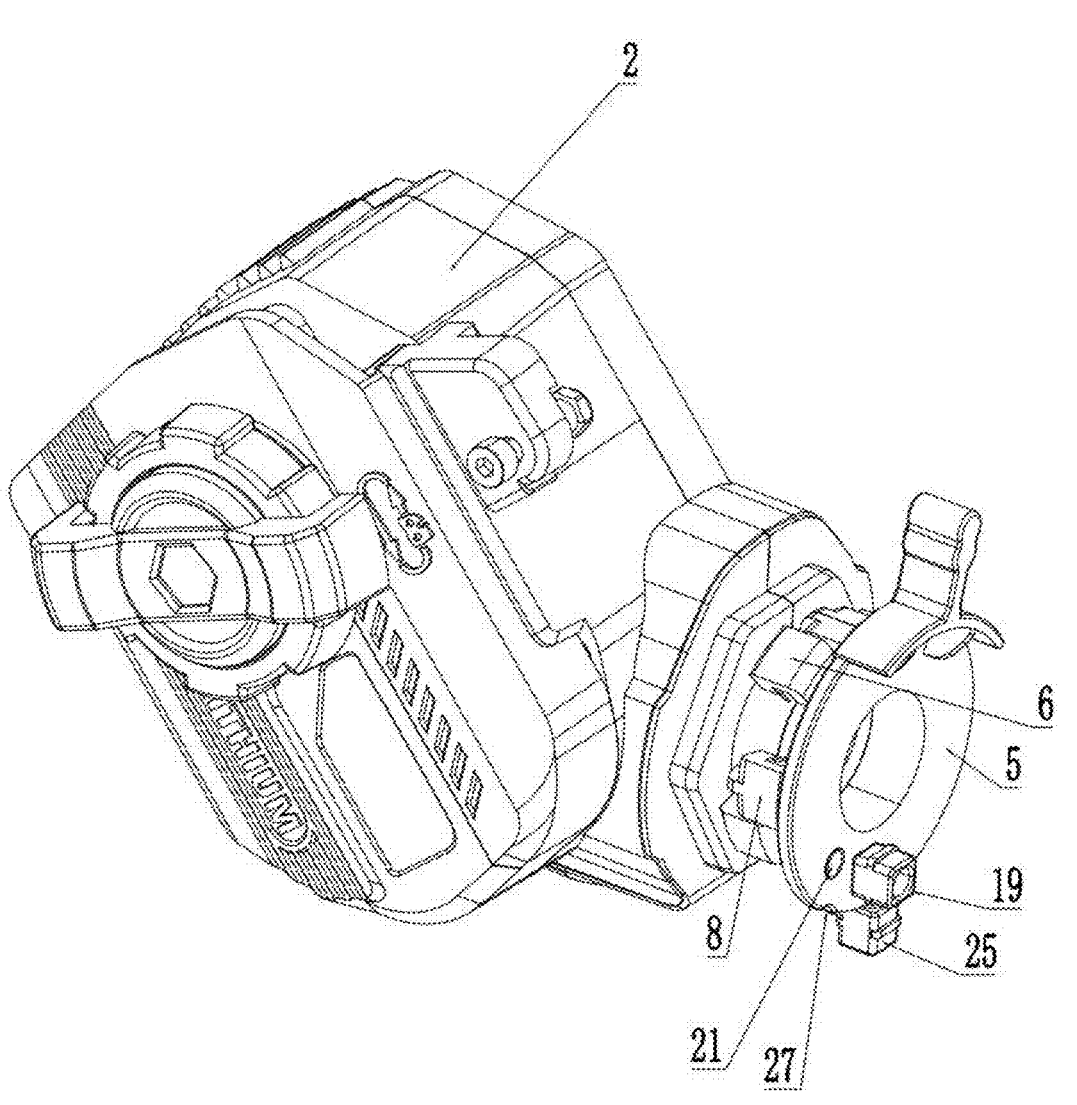
FIG. 16 is a schematic structural diagram of a tool head and a locking ring in a locked state of the present disclosure.
Figure 17:
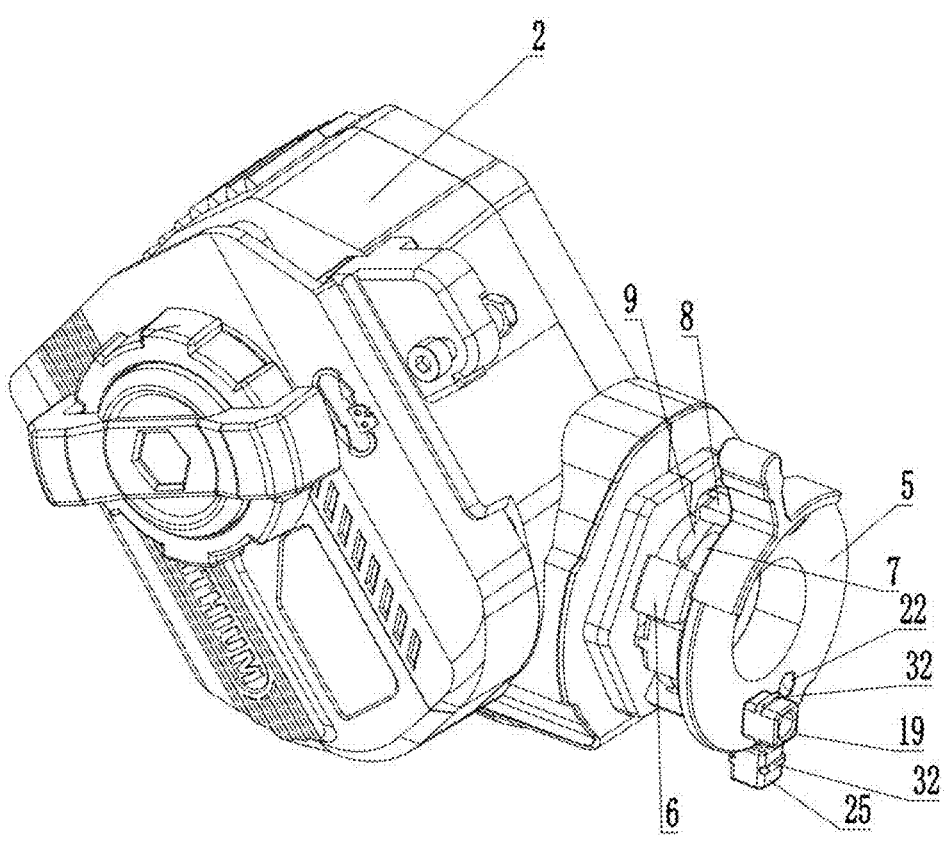
FIG. 17 is a schematic structural diagram of a tool head and a locking ring in an unlocked state of the present disclosure.
Figure 18:
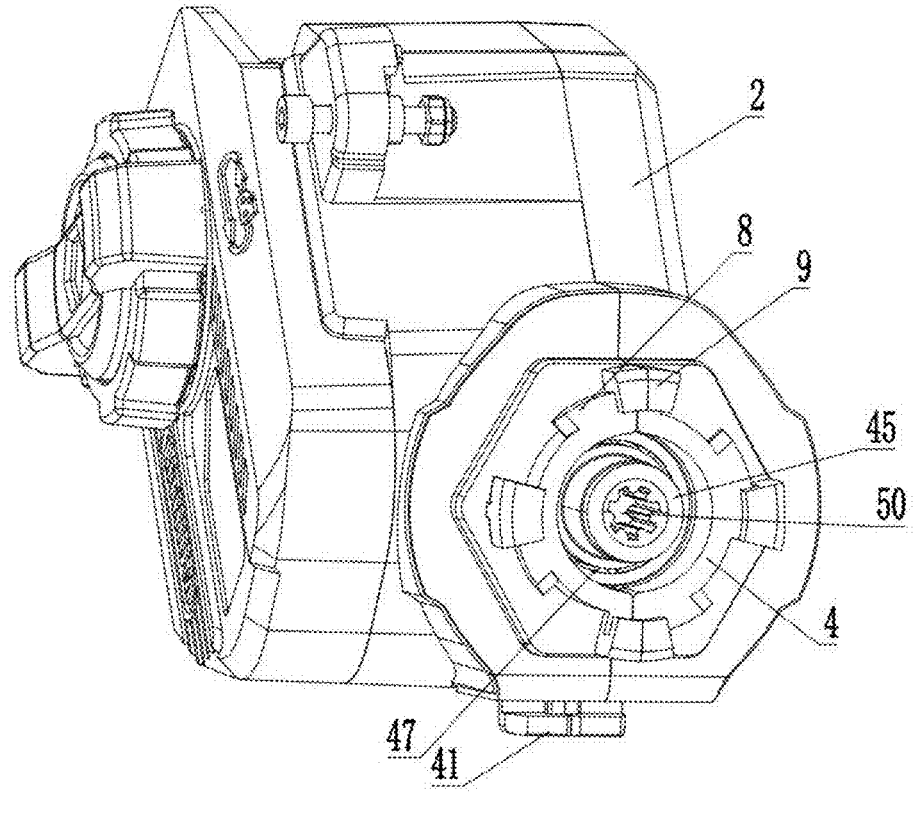
FIG. 18 is a perspective view of a tool head of the present disclosure.
Figure 19:
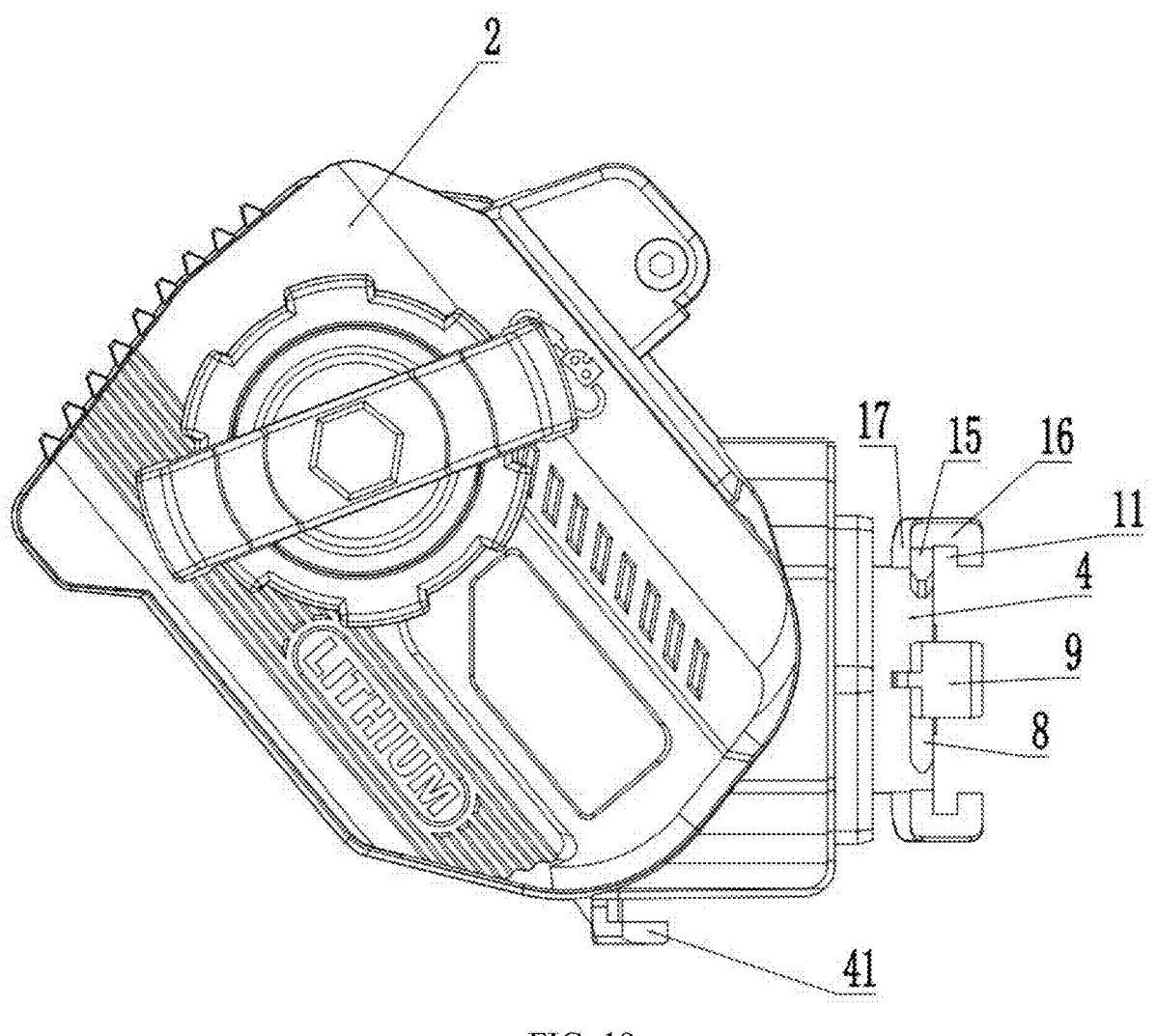
FIG. 19 is a schematic structural diagram of a tool head of the present disclosure.
Figure 20:
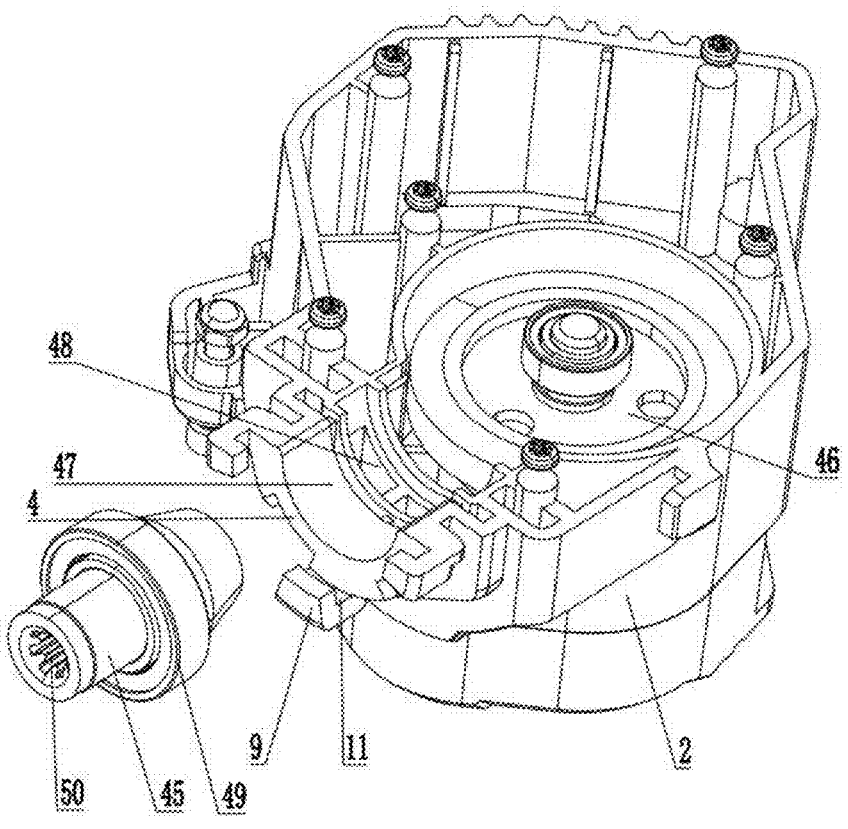
FIG. 20 is an exploded view of a tool head, a power transmission shaft, and a bearing of the present disclosure.
Figure 21:
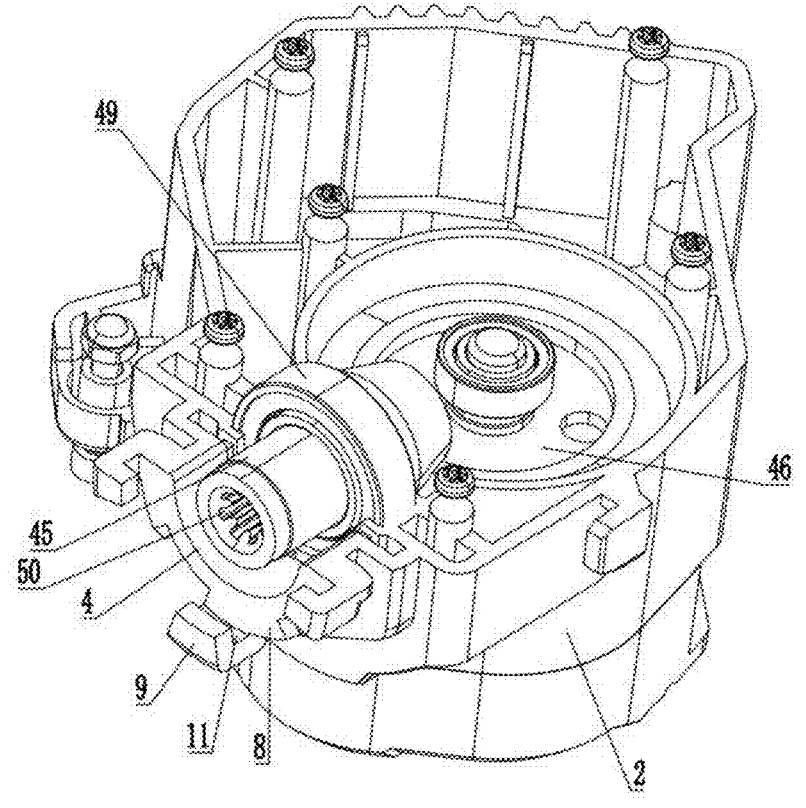
FIG. 21 is a schematic diagram of an internal structure of a tool head of the present disclosure.

1—body; 2—tool head; 3—connecting end; 4—connecting portion; 5—locking ring; 6—first locking clasp; 7—first locking block; 8—second locking block; 9—second locking clasp; 10—first locking groove; 11—second locking groove; 12—actuating portion; 13—first connecting plate; 14—first clasping portion; 15—second connecting plate; 16—second clasping portion; 17—reinforcing rib; 18—first mounting slot; 19—main damping block; 20—main damping protrusion; 21—upper damping recess; 22—lower damping recess; 23—main damping spring; 24—second mounting slot; 25—secondary damping block; 26—secondary damping protrusion; 27—upper damping notch; 28—lower damping notch; 29—secondary damping spring; 30—limiting groove; 31—abutment portion; 32—snap-fit portion; 33—sliding channel; 34—pushing plate; 35—installation channel; 36—first limiting post; 37—second limiting post; 38—pushing spring; 39—limiting portion; 40—limiting protrusion; 41—connecting block; 42—driving motor; 43—control button; 44—power output shaft; 45—power transmission shaft; 46—driving assembly; 47—connecting hole; 48—bearing groove; 49—bearing; 50—linkage hole; and 51—actuating channel.

DETAILED DESCRIPTIONS OF THE EMBODIMENTS

The present disclosure is further described below in combination with specific examples:

The present disclosure belongs to the technical field of electric tools, and particularly relates to a tool head replacement structure for electric tools. The tool head replacement structure includes a body 1, a tool head 2, and a locking mechanism arranged between the body 1 and the tool head 2. A connecting portion 4 of the tool head 2 is annularly provided with a plurality of second locking blocks 8 and second locking clasps 9. The locking mechanism includes a locking ring 5, and an actuating portion 12 on the locking ring 5 is exposed outside the body 1, such that the user easily drives the locking ring 5 to rotate through the actuating portion 12, and the tool head 2 is quickly installed on the body 1. The locking ring 5 is arranged in a connecting end 3, the number of first locking clasps 6 and first locking blocks 7 on the locking ring 5 is the same as the number of the second locking blocks 8 and the second locking clasps 9 on the tool head 2, and the locking ring 5, the first locking clasps 6, the first locking blocks 7, and the actuating portion 12 are all integrally formed, which facilitates manual assembly. Moreover, integral forming enhances the overall strength of components and extends the service life. To install the tool head 2 on the body 1, the user first needs to insert the connecting portion 4 on the tool head 2 into the connecting end 3 of the body 1. In this case, the user drives the locking ring 5 to rotate synchronously by rotating the actuating portion 12. Since the second locking clasp 9 on the tool head 2 and the first locking clasp 6 on the locking ring 5 are respectively provided with a second locking groove 11 and a first locking groove 10, after the locking ring 5 rotates, the first locking blocks 7 on the locking ring 5 rotate synchronously together with the locking ring 5, such that the first locking blocks 7 enter the second locking grooves 11 and are snap-fitted with the second locking clasps 9. The first locking blocks 7 and the second locking clasps 9 are snap-fitted with each other to form a first-layer locking structure. Simultaneously, the first locking clasps 6 on the locking ring 5 also rotate synchronously together with the locking ring 5, such that the second locking blocks 8 smoothly enter the first locking grooves 10 and are snap-fitted with the first locking clasps 6. The first locking clasps 6 and the second locking blocks 8 are snap-fitted with each other to form a second-layer locking structure, such that the tool head 2 is stably installed on the connecting end 3 of the body 1. To disassemble the tool head 2 from the body 1, the user only needs to reversely rotate the actuating portion 12 to drive the locking ring 5 to reversely rotate synchronously. In this case, the first locking blocks 7 on the locking ring 5 disengage from the second locking grooves 11 and snap-fitted connection with the second locking clasps 9 is released, and simultaneously, the second locking blocks 8 on the connecting portion 4 disengage from the first locking grooves 10 and snap-fitted connection with the first locking clasps 6 is released, such that locked connection between the connecting portion 4 on the tool head 2 and the locking ring 5 in the body 1 is released, and the tool head 2 is smoothly separated from the body 1. In an electric tool currently available on the market, a contact area between the tool head 2 and the body 1 is relatively small, a locking force between the tool head 2 and the body 1 is weak. After the tool head 2 operates for a long time, a joint between the tool head 2 and the body 1 is easily loosened, resulting in that the tool head 2 shakes, thereby affecting the use by the operator. A double-layer locking structure of the present disclosure ensures that the connecting portion 4 on the tool head 2 and the locking ring 5 in the body 1 are mutually locked with each other. A contact area between the connecting portion 4 on the tool head 2 and the locking ring 5 is significantly increased through cooperation of the first locking blocks 7, the second locking clasps 9, the second locking blocks 8, and the first locking clasps 6, such that the locking force between the connecting portion 4 on the tool head 2 and the locking ring 5 in the body 1 is greater, and the tool head 2 is stably and firmly installed on the connecting end 3 of the body 1. After the tool head 2 operates for a long time, the joint between the tool head 2 and the body 1 is not loosened, which ensures the normal use by the user, and prevents casualties caused when the tool head 2 falls to the ground during operation.

Preferably, the first locking clasp 6 includes a first connecting plate 13 and a first clasping portion 14 that are integrally formed, the first clasping portion 14 is "L"-shaped and transversely arranged at a top end of the first connecting plate 13, the first locking block 7 is located on one side of the first connecting plate 13 and integrally formed with the first connecting plate 13, and the second locking clasp 9 includes a second connecting plate 15 and a second clasping portion 16 that are integrally formed, where the second clasping portion 16 is "L"-shaped and transversely arranged at a top end of the second connecting plate 15, and the second locking block 8 is located on one side of the second connecting plate 15 and integrally formed with the second connecting plate 15; the first locking clasp 6 includes the first connecting plate 13 and the first clasping portion 14 that are integrally formed, the second locking clasp 9 includes the second connecting plate 15 and the second clasping portion 16 that are integrally formed, the overall rigidity of the first locking clasp 6 and the second locking clasp 9 that are integrally formed is enhanced, and the service life of the first locking clasp 6 and the second locking clasp 9 is extended; the first locking block 7 on the locking ring 5 is located on one side of the first connecting plate 13 and integrally formed with the first connecting plate 13, the second locking block 8 on the connecting portion 4 is located on one side of the second connecting plate 15 and integrally formed with the second connecting plate 15, that is, the first locking block 7 on the locking ring 5 is arranged together with the first locking clasp 6 and integrally formed with the first locking clasp 6, and the second locking block 8 on the connecting portion 4 is arranged together with the second locking clasp 9 and integrally formed with the second locking clasp 9, such that the locking force between the first locking block 7 and the second locking clasp 9 and between the first locking clasp 6 and the second locking block 8 is stronger, and the tool head 2 is more firmly installed on the body 1.

Preferably, a reinforcing rib 17 is arranged on a rear side surface of the first connecting plate 13; and the reinforcing rib 17 is arranged to enhance the overall rigidity of the first connecting plate 13, which avoids the situation that the first connecting plate 13 is broken and the tool head 2 cannot be smoothly installed on the body 1.

Preferably, a first mounting slot 18 is formed in the body 1, the first mounting slot 18 is located on a rear side of the locking ring 5, an opening is formed on one side of the first mounting slot 18 facing the locking ring 5, a main damping block 19 is movably arranged in the first mounting slot 18, a front end of the main damping block 19 penetrates the opening and is exposed outside the first mounting slot 18, a main damping protrusion 20 is arranged at the front end of the main damping block 19, and an upper damping recess 21 and a lower damping recess 22 are formed on a back surface of the locking ring 5, the main damping protrusion 20 is snap-fitted into the upper damping recess 21 or the lower damping recess 22 and abuts against the locking ring 5, and a main damping spring 23 is further arranged in the first mounting slot 18, where both ends of the main damping spring 23 respectively abut against an inner wall of the first mounting slot 18 and a rear end of the main damping block 19; arrangement of the first mounting slot 18 ensures that the main damping block 19 is smoothly installed in the body 1 and avoids random movement of the main damping block 19 in the body 1, and an opening is formed on one side of the first mounting slot 18 facing the locking ring 5, such that the front end of the main damping block 19 is smoothly exposed outside the first mounting slot 18, and the main damping protrusion 20 at the front end of the main damping block 19 is smoothly snap-fitted into the upper damping recess 21 or the lower damping recess 22 on the back surface of the locking ring 5; when the tool head 2 is not yet installed on the body 1, the main damping protrusion 20 is located in the upper damping recess 21, and since both ends of the main damping spring 23 in the first mounting slot 18 respectively abut against the inner wall of the first mounting slot 18 and the rear end of the main damping block 19, the main damping spring 23 exerts a force to the main damping block 19, such that the locking ring 5 cannot rotate by itself, which achieves the function of interchangeable locking, and does not affect the insertion of the connecting portion 4 of the tool head 2 into the connecting end 3 of the body 1; after the user inserts the connecting portion 4 on the tool head 2 into the connecting end 3 of the body 1, the user drives the locking ring 5 to rotate in the connecting end 3 through the actuating portion 12 by applying a predetermined force to the actuating portion 12, and after the locking ring 5 rotates to a predetermined position, the first locking clasp 6 and the second locking block 8, and also the first locking block 7 and the second locking clasp 9 are locked, such that the tool head 2 is smoothly installed on the connecting end 3 of the body 1; in this process, since the main damping protrusion 20 is an arc-shaped protrusion, and the upper damping recess 21 and the lower damping recess 22 are both arc-shaped recesses, when the locking ring 5 rotates, the locking ring 5 pushes the main damping block 19 to move inward through the upper damping recess 21, such that the main damping spring 23 enters a compressed state; when the locking ring 5 rotates to a predetermined angle, after a position of the main damping protrusion 20 on the main damping block 19 corresponds to a position of the lower damping recess 22, the compressed main damping spring 23 pushes the main damping block 19 to move outward, such that the main damping protrusion 20 on the main damping block 19 enters the lower damping recess 22; and after the tool head 2 is installed on the body 1, the locking ring 5 cannot rotate by itself, which avoids the situation that the first locking clasp 6 and the second locking block 8, and also the first locking block 7 and the second locking clasp 9 are automatically unlocked during the operation of the tool head 2.

Preferably, a second mounting slot 24 is further formed in the body 1, the second mounting slot 24 is located on a right side of the locking ring 5, an opening is formed on one side of the second mounting slot 24 facing the locking ring 5, a secondary damping block 25 is movably arranged in the second mounting slot 24, a front end of the secondary damping block 25 penetrates the opening and is exposed outside the second mounting slot 24, a secondary damping protrusion 26 is arranged at the front end of the secondary damping block 25, an upper damping notch 27 and a lower damping notch 28 are formed on a side surface of the locking ring 5, the secondary damping protrusion 26 is snap-fitted into the upper damping notch 27 or the lower damping notch 28 and abuts against the locking ring 5, and a secondary damping spring 29 is further arranged in the second mounting slot 24, where both ends of the secondary damping spring 29 respectively abut against an inner wall of the second mounting slot 24 and a rear end of the secondary damping block 25; arrangement of the second mounting slot 24 ensures that the secondary damping block 25 is smoothly installed in the body 1 and avoids random movement of the secondary damping block 25 in the body 1, and an opening is formed on one side of the second mounting slot 24 facing the locking ring 5, such that the front end of the secondary damping block 25 is smoothly exposed outside the second mounting slot 24, and the secondary damping protrusion 26 at the front end of the secondary damping block 25 is smoothly snap-fitted into the upper damping notch 27 or the lower damping notch 28 on the side surface of the locking ring 5; when the tool head 2 is not yet installed on the body 1, the secondary damping protrusion 26 is located in the upper damping notch 27, and since both ends of the secondary damping spring 29 in the second mounting slot 24 respectively abut against the inner wall of the second mounting slot 24 and the rear end of the secondary damping block 25, the secondary damping spring 29 exerts a force to the secondary damping block 25, such that the locking ring 5 cannot rotate by itself, which does not affect the insertion of the connecting portion 4 of the tool head 2 into the connecting end 3 of the body 1; after the user inserts the connecting portion 4 on the tool head 2 into the connecting end 3 of the body 1, the user drives the locking ring 5 to rotate in the connecting end 3 through the actuating portion 12 by applying a predetermined force to the actuating portion 12, and after the locking ring 5 rotates to a predetermined position, the first locking clasp 6 and the second locking block 8, and also the first locking block 7 and the second locking clasp 9 are locked, such that the tool head 2 is smoothly installed on the connecting end 3 of the body 1; a shape of the secondary damping protrusion 26 is the same as a shape of the main damping protrusion 20, and the upper damping notch 27 and the lower damping notch 28 are arc-shaped notches, such that when the locking ring 5 rotates, the locking ring 5 pushes the secondary damping block 25 to move inward through the upper damping notch 27, and the secondary damping spring 29 enters a compressed state; when the locking ring 5 rotates to a predetermined angle, after a position of the secondary damping protrusion 26 corresponds to a position of the lower damping notch 28, the compressed secondary damping spring 29 pushes the secondary damping block 25 to move outward, such that the secondary damping protrusion 26 enters the lower damping notch 28; and after the tool head 2 is installed on the body 1, the locking ring 5 cannot rotate by itself, which avoids the situation that the first locking clasp 6 and the second locking block 8, and also the first locking block 7 and the second locking clasp 9 are automatically unlocked during the operation of the tool head 2; when the secondary damping protrusion 26 enters the lower damping notch 28, the main damping protrusion 20 on the main damping block 19 in the first mounting slot 18 enters the lower damping recess 22, such that the main damping block 19 and the secondary damping block 25 cooperate with each other to achieve a dual damping effect on the locking ring 5, which ensures that the locking ring 5 cannot rotate by itself without an external force, thereby enhancing stability and reliability; when the main damping protrusion 20 positionally corresponds to the upper damping recess 21 or the lower damping recess 22, the main damping protrusion 20, under the pushing action of the main damping spring 23, enters the upper damping recess 21 or the lower damping recess 22 and hits against an inner wall of the upper damping recess 21 or the lower damping recess 22, and an impact sound is generated; when the secondary damping protrusion 26 enters the upper damping notch 27 and the lower damping notch 28, an impact sound is also generated, which prompts the user that the tool head 2 and the body 1 are locked or the tool head 2 and the body 1 are unlocked, facilitates subsequent operations by the user, and enhances the practicability of the product.

Preferably, a limiting groove 30 is formed at a rear end of either of the main damping block 19 and the secondary damping block 25, and the main damping spring 23 and the secondary damping spring 29 are respectively arranged in the limiting grooves 30 of the main damping block 19 and the secondary damping block 25; and one end of the main damping spring 23 is arranged in the limiting groove 30 on the main damping block 19 to ensure that the main damping spring 23 always abuts against the main damping block 19, and one end of the secondary damping spring 29 is arranged in the limiting groove 30 on the secondary damping block 25 to ensure that the secondary damping spring 29 always abuts against the secondary damping block 25, such that the locking ring 5 cannot rotate by itself.

Preferably, abutment portions 31 are symmetrically arranged on inner walls of both sides of the first mounting slot 18 and the second mounting slot 24, snap-fit portions 32 are arranged on both sides of both the main damping block 19 and the secondary damping block 25, and the snap-fit portion 32 is arranged between the symmetric abutment portions 31; since the snap-fit portions 32 on both sides of the main damping block 19 are respectively arranged between the abutment portions 31 on both sides of the first mounting slot 18, when the user assembles the main damping block 19 and the main damping spring 23 into the first mounting slot 18, the main damping spring 23 cannot completely push the main damping block 19 out of the first mounting slot 18; and since the snap-fit portions 32 on both sides of the secondary damping block 25 are respectively arranged between the abutment portions 31 on both sides of the second mounting slot 24, when the user assembles the secondary damping block 25 and the secondary damping spring 29 into the second mounting slot 24, the secondary damping spring 29 cannot completely push the secondary damping block 25 out of the second mounting slot 24, which does not affect the subsequent assembly by the user.

Preferably, a sliding channel 33 is arranged in the body 1, a pushing plate 34 is slidably arranged in the sliding channel 33, an installation channel 35 is arranged on the pushing plate 34, a first limiting post 36 and a second limiting post 37 are arranged in the installation channel 35, a pushing spring 38 is arranged in the installation channel 35, a front end of the pushing spring 38 is sleeved on the first limiting post 36, a rear end of the pushing spring 38 is sleeved on the second limiting post 37, limiting portions 39 are arranged on both sides of an inner wall of the sliding channel 33, and a limiting protrusion 40 is arranged at a top end of the limiting portion 39, where a front end of the pushing spring 38 abuts against the limiting portion 39 and the limiting protrusion 40, the tool head 2 is further provided with a connecting block 41, and the connecting block 41 is inserted into the sliding channel 33; after the connecting portion 4 on the tool head 2 is inserted into the connecting end 3 of the body 1, the connecting block 41 on the tool head 2 is inserted into the sliding channel 33 of the body 1, and the connecting block 41 pushes the pushing plate 34 in the sliding channel 33 to move inward; the pushing spring 38 is arranged in the installation channel 35 of the pushing plate 34, and front and rear ends of the pushing spring 38 are respectively sleeved on the first limiting post 36 and the second limiting post 37 of the installation channel 35, such that the pushing spring 38 is smoothly installed in the installation channel 35, and the pushing spring 38 is restricted from moving randomly in the installation channel 35; in the assembling process, the user only needs to install the separate pushing plate 34 into the sliding channel 33, thereby facilitating assembly by the user; since the front end of the pushing spring 38 abuts against the limiting portions 39 on both sides of the inner wall of the sliding channel 33 and the limiting protrusion 40 at the top end of the limiting portion 39, when the pushing plate 34 moves inward, the pushing spring 38 is compressed, that is, the pushing spring 38 enters a compressed state; arrangement of the limiting protrusions 40 increases an area of contact with a front end surface of the pushing spring 38, such that the pushing spring 38 is stressed more uniformly; when the actuating portion 12 is rotated, the first locking block 7 and the second locking clasp 9, and also the first locking clasp 6 and the second locking block 8 are unlocked, and in this case, the compressed pushing spring 38 pushes the pushing plate 34 to move outward; when the pushing plate 34 moves outward, the connecting block 41 on the tool head 2 is pushed to move outward, and finally the tool head 2 automatically moves outward for a predetermined distance, such that the user easily removes the tool head 2 from the body 1; and a diameter of the spring of the present disclosure may be enlarged, such that a pushing force of the pushing spring 38 becomes stronger, and it is ensured that the tool head 2 moves outward for a predetermined distance.

Preferably, a driving motor 42 and a control button 43 configured to control the operation of the driving motor 42 are further arranged in the body 1, a power output shaft 44 is arranged on the driving motor 42, the power output shaft 44 is located in the connecting end 3, the tool head 2 is provided with a power transmission shaft 45 and a driving assembly 46 connected to the power transmission shaft 45, a connecting hole 47 is formed on the connecting portion 4, the power transmission shaft 45 is arranged in the connecting hole 47, a bearing groove 48 is formed on an inner wall of the connecting hole 47, a bearing 49 is sleeved on the power transmission shaft 45, the bearing 49 is arranged in the bearing groove 48, and the power transmission shaft 45 is provided with a linkage hole 50, where after the connecting portion 4 is inserted into the connecting end 3, the power output shaft 44 is inserted into the linkage hole 50 of the power transmission shaft 45; after the user inserts the connecting portion 4 on the tool head 2 into the connecting end 3 of the body 1, the power output shaft 44 in the connecting end 3 enters the linkage hole 50 of the power transmission shaft 45 and is fixedly connected to the power transmission shaft 45, and in this case, the user controls the driving motor 42 to operate by pressing the control button 43, such that the driving motor 42 smoothly drives the power output shaft 44 to rotate, and the power transmission shaft 45 rotates synchronously together with the power output shaft 44; after the power output shaft 44 rotates, the driving assembly 46 is driven to operate, such that the tool head 2 smoothly operates; arrangement of the connecting hole 47 on the connecting portion 4 ensures that the power transmission shaft 45 is smoothly connected to the power output shaft 44 in the body 1, such that the connection between the power transmission shaft 45 and the power output shaft 44 is more stable and firm, which enhances the transmission efficiency; the bearing 49 is sleeved on the power transmission shaft 45, which reduces the friction generated when the power transmission shaft 45 rotates, reduces the wear of the power transmission shaft 45, and extends the service life of the power transmission shaft 45; the bearing 49 is installed in the bearing groove 48 on the inner wall of the connecting hole 47, which restricts the bearing 49 from moving randomly in the connecting hole 47 and ensures that the power transmission shaft 45 rotates normally; the power transmission shaft 45 is integrally formed, such that the power transmission shaft 45 has a higher overall strength and is not prone to damage; and in the assembling process, the user only needs to sleeve the bearing 49 onto the power transmission shaft 45 and then install the bearing 49 in the bearing groove 48, to complete the installation of the power transmission shaft 45 in a simple, rapid, and convenient manner.

Preferably, an actuating channel 51 is arranged in the body 1, and the actuating portion 12 penetrates the actuating channel 51 and is exposed outside the body 1; arrangement of the actuating channel 51 on the body 1 ensures that the actuating portion 12 on the locking ring 5 smoothly penetrates the actuating channel 51 and is exposed outside the body 1, and the user smoothly rotates the actuating portion 12 to move along the actuating channel 51, such that the tool head 2 is smoothly installed on the body 1 or removed from the body 1.

The above are merely preferred examples of the present disclosure and are not intended to limit the protection scope of the present disclosure. Therefore, any equivalent changes made based on the structure, shape and principles of the present disclosure shall fall within the protection scope of the present disclosure.

What is claimed is:

1. A tool head replacement structure for electric tools, comprising a body, a tool head detachably arranged on the body, a locking mechanism arranged between the body and the tool head;

wherein the body is provided with a connecting end, a connecting portion is arranged on one side of the tool head facing the connecting end, and the connecting portion is arranged in the connecting end;

wherein the locking mechanism comprises a locking ring arranged in the connecting end, the locking ring is annularly provided with a plurality of first locking clasps and first locking blocks, and the connecting portion is annularly provided with a plurality of second locking blocks and second locking clasps that are matched with the plurality of first locking clasps and first locking blocks;

wherein each locking clasp and each second locking clasp are provided with a first locking groove and a second locking groove, the locking ring is provided with an actuating portion exposed outside the body, and the locking ring is driven to rotate by driving the actuating portion; in this case, the first locking block and the second locking block are snap-fitted into the second locking groove and the first locking groove and snap-fitted with the second locking clasp and the first locking clasp, such that the tool head and the body are locked; and when the actuating portion is driven to rotate reversely, the first locking block and the second locking block disengage from the second locking groove and the first locking groove, such that the tool head and the body are unlocked;

wherein the first locking clasp comprises a first connecting plate and a first clasping portion that are integrally formed, the first clasping portion is "L"-shaped and transversely arranged at a top end of the first connecting plate, the first locking block is located on one side of the first connecting plate and integrally formed with the first connecting plate, and the second locking clasp comprises a second connecting plate and a second clasping portion that are integrally formed; and wherein the second clasping portion is "L"-shaped and transversely arranged at a top end of the second connecting plate, and the second locking block is located on one side of the second connecting plate and integrally formed with the second connecting plate.

2. The tool head replacement structure for electric tools according to claim 1, wherein a reinforcing rib is arranged on a rear side surface of the first connecting plate.

3. The tool head replacement structure for electric tools according to claim 1, wherein a first mounting slot is formed in the body, the first mounting slot is located on a rear side of the locking ring, an opening is formed on one side of the first mounting slot facing the locking ring, a main damping block is arranged in the first mounting slot, a front end of the main damping block penetrates the opening and is exposed outside the first mounting slot, a main damping protrusion is arranged at the front end of the main damping block, and an upper damping recess and a lower damping recess are formed on a back surface of the locking ring, the main damping protrusion is snap-fitted into the upper damping recess or the lower damping recess and abuts against the locking ring, and a main damping spring is further arranged in the first mounting slot, wherein both ends of the main damping spring abut against an inner wall of the first mounting slot and a rear end of the main damping block.

4. The tool head replacement structure for electric tools according to claim 3, wherein a second mounting slot is further formed in the body, the second mounting slot is located on a right side of the locking ring, an opening is formed on one side of the second mounting slot facing the locking ring, a secondary damping block is arranged in the second mounting slot, a front end of the secondary damping block penetrates the opening and is exposed outside the second mounting slot, a secondary damping protrusion is arranged at the front end of the secondary damping block, an upper damping notch and a lower damping notch are formed on a side surface of the locking ring, the secondary damping protrusion is snap-fitted into the upper damping notch or the lower damping notch and abuts against the locking ring, and a secondary damping spring is further arranged in the second mounting slot, wherein both ends of the secondary damping spring abut against an inner wall of the second mounting slot and a rear end of the secondary damping block.

5. The tool head replacement structure for electric tools according to claim 4, wherein a limiting groove is formed at a rear end of either of the main damping block and the secondary damping block, and the main damping spring and the secondary damping spring are arranged in the limiting grooves of the main damping block and the secondary damping block.

6. The tool head replacement structure for electric tools according to claim 4, wherein abutment portions are symmetrically arranged on inner walls of both sides of the first mounting slot and the second mounting slot, snap-fit portions are arranged on both sides of both the main damping block and the secondary damping block, and the snap-fit portion is arranged between the symmetric abutment portions.

7. The tool head replacement structure for electric tools according to claim 1, wherein a sliding channel is arranged in the body, a pushing plate is arranged in the sliding channel, an installation channel is arranged on the pushing plate, a first limiting post and a second limiting post are arranged in the installation channel, a pushing spring is arranged in the installation channel, a front end of the pushing spring is sleeved on the first limiting post, a rear end of the pushing spring is sleeved on the second limiting post, limiting portions are arranged on both sides of an inner wall of the sliding channel, and a limiting protrusion is arranged at a top end of the limiting portion, wherein a front end of the pushing spring abuts against the limiting portion and the limiting protrusion, the tool head is further provided with a connecting block, and the connecting block is inserted into the sliding channel.

8. The tool head replacement structure for electric tools according to claim 1, wherein a driving motor and a control button configured to control the operation of the driving motor are further arranged in the body, a power output shaft is arranged on the driving motor, the power output shaft is located in the connecting end, the tool head is provided with a power transmission shaft and a driving assembly connected to the power transmission shaft, a connecting hole is formed on the connecting portion, the power transmission shaft is arranged in the connecting hole, a bearing groove is formed on an inner wall of the connecting hole, a bearing is sleeved on the power transmission shaft, the bearing is arranged in the bearing groove, and the power transmission shaft is provided with a linkage hole, wherein after the connecting portion is inserted into the connecting end, the power output shaft is inserted into the linkage hole of the power transmission shaft.

9. The tool head replacement structure for electric tools according to claim 1, wherein an actuating channel is arranged in the body, and the actuating portion penetrates the actuating channel and is exposed outside the body.

* * * * *